United States Patent
Misra et al.

(10) Patent No.: US 11,734,783 B2
(45) Date of Patent: Aug. 22, 2023

(54) SYSTEM AND METHOD FOR DETECTING ON-STREET PARKING VIOLATIONS

(71) Applicant: Tata Consultancy Services Limited, Mumbai (IN)

(72) Inventors: Prasant Kumar Misra, Bangalore (IN); Arunchandar Vasan, Chennai (IN); Krishna Kumar Sunil Komdam, Bangalore (IN); Anand Sivasubramaniam, Chennai (IN); Alok Ranjan, Rourkela (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 693 days.

(21) Appl. No.: 16/713,743

(22) Filed: Dec. 13, 2019

(65) Prior Publication Data

US 2020/0394425 A1   Dec. 17, 2020

(30) Foreign Application Priority Data

Jun. 11, 2019   (IN) .............................. 201921023166

(51) Int. Cl.
*G06K 9/00*   (2022.01)
*G06K 9/62*   (2022.01)
(Continued)

(52) U.S. Cl.
CPC ............ *G06Q 50/30* (2013.01); *G06F 18/214* (2023.01); *G06F 18/23* (2023.01); *G06V 20/10* (2022.01);
(Continued)

(58) Field of Classification Search
CPC ............ G06K 2209/21; G06K 2209/23; G06K 2209/27; G06K 9/00664; G06K 9/00818;
(Continued)

(56) References Cited

U.S. PATENT DOCUMENTS 9,779,309 B1 *   10/2017   Fink ..................... G06F 16/7867
2010/0067745 A1 *   3/2010   Kovtun .................. G06V 20/40
                                                                382/106
(Continued)

FOREIGN PATENT DOCUMENTS

| CN | 107730903 | | 2/2018 | |
|---|---|---|---|---|
| CN | 109147340 | A * | 1/2019 | ......... G06K 9/00785 |
| CN | 109344746 | | 2/2019 | |
| JP | 2010-39825 | | 2/2010 | |
| KR | 10-0785759 | | 12/2007 | |

OTHER PUBLICATIONS

Benslimane S, Tamayo S, de La Fortelle A. Classifying logistic vehicles in cities using Deep learning. arXiv preprint arXiv: 1906.11895. Jun. 4, 2019. (Year: 2019).*
(Continued)

*Primary Examiner* — Michael J Vanchy, Jr.
(74) *Attorney, Agent, or Firm* — Finnegan, Henderson, Farabow, Garrett & Dunner LLP

(57) ABSTRACT

This disclosure relates generally to method and system for detecting on-street parking violations. The method include capturing, by using an media capturing device embodied in an electronic device mounted in a vehicle, a video stream of a scene during a trip of the vehicle. The video stream is processed at the electronic device to identify target objects such as no-parking signage and vehicles parked in the vicinity thereof. A meta-information associated with the target objects is stored in form of a short-term historian in a repository associated with the electronic device. The absolute locations of the target objects are determined and the historian is updated with the values of the absolute locations. A set of unique target objects is determined from amongst the target objects and a meta-information associated with the unique objects is sent to a cloud server for determining parking violations.

3 Claims, 11 Drawing Sheets

(51) Int. Cl.
   *G06Q 50/30*     (2012.01)
   *G06V 20/58*     (2022.01)
   *G06V 20/10*     (2022.01)
   *G06F 18/23*     (2023.01)
   *G06F 18/214*    (2023.01)

(52) U.S. Cl.
   CPC .......... *G06V 20/582* (2022.01); *G06V 20/584* (2022.01); *G06V 2201/07* (2022.01); *G06V 2201/08* (2022.01); *G06V 2201/10* (2022.01)

(58) Field of Classification Search
   CPC ............. G06K 9/00825; G06K 9/6218; G06K 9/6256; G06Q 10/063; G06Q 50/26; G06Q 50/30
   See application file for complete search history.

(56) References Cited

U.S. PATENT DOCUMENTS

2019/0096069 A1* 3/2019 Qian .................... G05D 1/0094
2021/0042531 A1* 2/2021 Zhang .................. G06V 20/582

OTHER PUBLICATIONS

Grassi, G. et al. "ParkMaster: An in-vehicle, edge-based video analytics service for detecting open parking spaces in urban environments," *Proceeding SEC '17 Proceedings of the Second ACM/IEEE Symposium on Edge Computing,* Oct. 12-14, 2017, San Jose, California; pp. 1-14.

\* cited by examiner

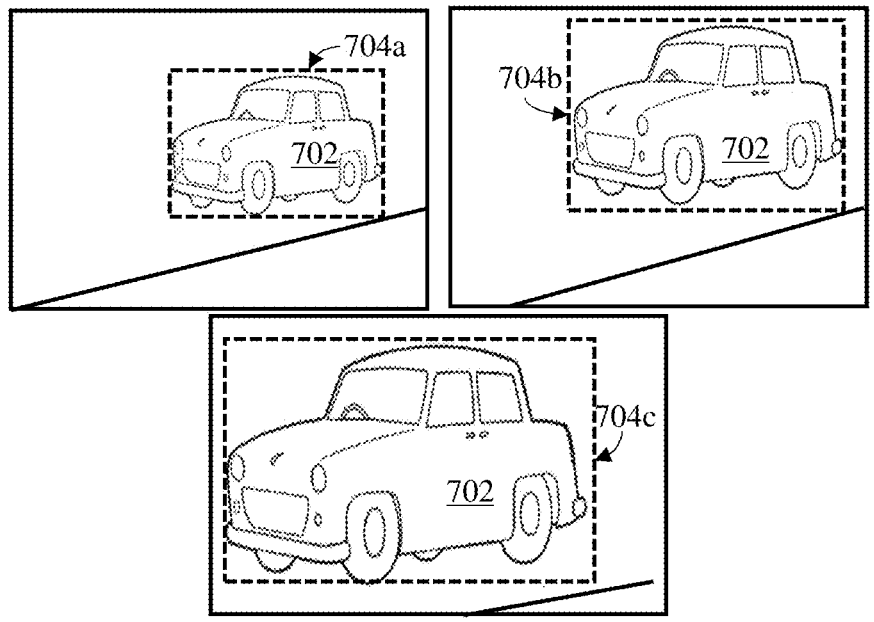

FIG. 7

| |
|---|
| RECEIVE, VIA ONE OR MORE FIRST HARDWARE PROCESSORS, A VIDEO STREAM OF A SCENE DURING A TRIP OF THE VEHICLE CAPTURED BY USING AN MEDIA CAPTURING DEVICE EMBODIED IN A AN ELECTRONIC DEVICE MOUNTED IN A VEHICLE — 802 |
| PROCESS, VIA THE ONE OR MORE FIRST HARDWARE PROCESSORS, THE VIDEO STREAM TO IDENTIFY A PLURALITY OF OBJECTS OF INTEREST AND A META-INFORMATION ASSOCIATED WITH THE PLURALITY OF OBJECTS OF INTEREST, THE PLURALITY OF OBJECTS OF INTEREST COMPRISES ONE OR MORE NO-PARKING SIGNAGES AND ONE OR MORE VEHICLES IN A PREDETERMINED AREA AROUND THE ONE OR MORE NO-PARKING SIGNAGES, THE META-INFORMATION ASSOCIATED WITH THE PLURALITY OF OBJECTS OF INTEREST STORED IN A REPOSITORY ASSOCIATED WITH THE ELECTRONIC DEVICE IN FORM OF A HISTORIAN — 804 |

800

FIG. 8A

SYSTEM AND METHOD FOR DETECTING ON-STREET PARKING VIOLATIONS

PRIORITY CLAIM

This U.S. patent application claims priority under 35 U.S.C. § 119 to: India Application No. 201921023166, filed on Jun. 11, 2019. The entire contents of the aforementioned application are incorporated herein by reference.

TECHNICAL FIELD

This disclosure relates generally to parking violations, and more particularly to system and method for detection of on-street parking violations.

BACKGROUND

Over past couple of decade, a number of vehicles per unit area of street have increased manifolds. Even though the vehicles offer comfort to occupants, a sudden increase thereof has led to certain challenges, for example, available space for parking of said vehicles.

Vehicular parking plays an important role in the mobility and economic development of cities. An urban transport infrastructure that facilitates hassle-free movement of people and goods, needs to be complemented with similar quality parking facilities for a safe and comfortable end-to-end citizen experience. Indeed, hunting for a parking space is an uninviting yet common travail in urban living. It is also a source of revenue to cities. Parking, therefore, needs to be well managed in order to avoid both substandard citizen experience and revenue loss to cities.

SUMMARY

Embodiments of the present disclosure present technological improvements as solutions to one or more of the above-mentioned technical problems recognized by the inventors in conventional systems. For example, in one embodiment, a For example, in one embodiment, a method for detecting on-street parking violations is provided. The method includes receiving, via a first hardware processor associated with an electronic device, a video stream of a scene during a trip of the vehicle, the video stream captured by using a media capturing device embodied in the electronic device mounted in a vehicle. Further, the method includes processing, via the one or more first hardware processors, the video stream to identify a plurality of objects of interest and a meta-information associated with the plurality of objects of interest, the plurality of objects of interest comprises one or more no-parking signage and one or more vehicles in a predetermined area around the one or more no-parking signage, the meta-information associated with the plurality of objects of interest stored in a repository associated with the electronic device in form of a historian. Also, the method includes computing, via the one or more first hardware processors, absolute locations of the plurality of objects of interest, wherein computing the absolute locations comprises: determining, for two or more consecutive object detection instances in the video stream, whether locations values of the media capturing device along x-coordinate and y-coordinate are changing, and computing, on determination of changing of locations values of the media capturing device along at least one of x-coordinate and y-coordinate, the absolute locations based on relative location values of the media capturing device from the detected objects. Moreover the method includes updating, via the one or more first hardware processors, the historian with the absolute locations of the one or more no-parking signage and one or more vehicle to obtain an updated historian. Also, the method includes filtering, via the first hardware processors, the updated historian, via the one or more first hardware processors, to obtain a filtered historian, the filtering is performed to (1) determine a set of unique objects of interest from amongst the plurality of objects of interest, and (2) identify each vehicle from amongst the one or more vehicles as one of parked vehicle and moving vehicle, wherein the set of unique objects of interest and meta-information associated with the parked vehicle is stored in the filtered historian. Further, the method includes determining, via the one or more first hardware processors, parking violations based on a comparison of the filtered historian with a set of unique objects of interest with a parking violation data associated with a prescribed parking violation policy.

In another aspect, a system for detecting on-street parking violations is provided. The system includes one or more first memories; and one or more first hardware processors, the one or more first memories coupled to the one or more first hardware processors, wherein the one or more first hardware processors are configured to execute programmed instructions stored in the one or more first memories to receive a video stream of a scene during a trip of the vehicle, the video stream captured by using a media capturing device embodied in the electronic device mounted in a vehicle. Further, the first hardware processor is configured by the instructions to process, the video stream to identify a plurality of objects of interest and a meta-information associated with the plurality of objects of interest, the plurality of objects of interest comprises one or more no-parking signage and one or more vehicles in a predetermined area around the one or more no-parking signage, the meta-information associated with the plurality of objects of interest stored in a repository associated with the electronic device in form of a historian. Also, the one or more first hardware processors are configured by the instructions to compute absolute locations of the plurality of objects of interest, wherein computing the absolute locations comprises: determining, for two or more consecutive object detection instances in the video stream, whether locations values of the media capturing device along x-coordinate and y-coordinate are changing, and computing the absolute locations based on a determination of relative location values of the media capturing device from the detected objects on determination of changing locations values of the media capturing device along at least one of x-coordinate and y-coordinate. Moreover, the first hardware processor is configured by the instructions to update the historian with the absolute locations of the one or more no-parking signage and one or more vehicle to obtain an updated historian. Also, the first hardware processor is configured by the instructions to filter the updated historian, via the one or more first hardware processors, to obtain a filtered historian, the filtering is performed to (1) determine a set of unique objects of interest from amongst the plurality of objects of interest, and (2) identify each vehicle from amongst the one or more vehicles as one of parked vehicle and moving vehicle, wherein the set of unique objects of interest and meta-information associated with the parked vehicle is stored in the filtered historian. Further, the one or more first hardware processors are configured by the instructions to determine parking violations based on a comparison of the filtered historian with a parking violation data associated with a prescribed parking violation policy.

In yet another aspect, a non-transitory computer readable medium for a method for detecting on-street parking violations is provided. The method includes receiving, via a first hardware processor associated with an electronic device, a video stream of a scene during a trip of the vehicle, the video stream captured by using a media capturing device embodied in the electronic device mounted in a vehicle. Further, the method includes processing, via the one or more first hardware processors, the video stream to identify a plurality of objects of interest and a meta-information associated with the plurality of objects of interest, the plurality of objects of interest comprises one or more no-parking signage and one or more vehicles in a predetermined area around the one or more no-parking signage, the meta-information associated with the plurality of objects of interest stored in a repository associated with the electronic device in form of a historian. Also, the method includes computing, via the one or more first hardware processors, absolute locations of the plurality of objects of interest, wherein computing the absolute locations comprises: determining, for two or more consecutive object detection instances in the video stream, whether locations values of the media capturing device along x-coordinate and y-coordinate are changing, and computing, on determination of changing of locations values of the media capturing device along at least one of x-coordinate and y-coordinate, the absolute locations based on relative location values of the media capturing device from the detected objects. Moreover the method includes updating, via the one or more first hardware processors, the historian with the absolute locations of the one or more no-parking signage and one or more vehicle to obtain an updated historian. Also, the method includes filtering, via the first hardware processors, the updated historian, via the one or more first hardware processors, to obtain a filtered historian, the filtering is performed to (1) determine a set of unique objects of interest from amongst the plurality of objects of interest, and (2) identify each vehicle from amongst the one or more vehicles as one of parked vehicle and moving vehicle, wherein the set of unique objects of interest and meta-information associated with the parked vehicle is stored in the filtered historian. Further, the method includes determining, via the one or more first hardware processors, parking violations based on a comparison of the filtered historian with a set of unique objects of interest with a parking violation data associated with a prescribed parking violation policy.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7 is an example illustrating increase of bounding box dimensions for object of interest when an electronic device is travelling close to an object of interest.

FIGS. 8A and 8B illustrate an example flow diagram of a method for on-street parking violations, in accordance with an example embodiment.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
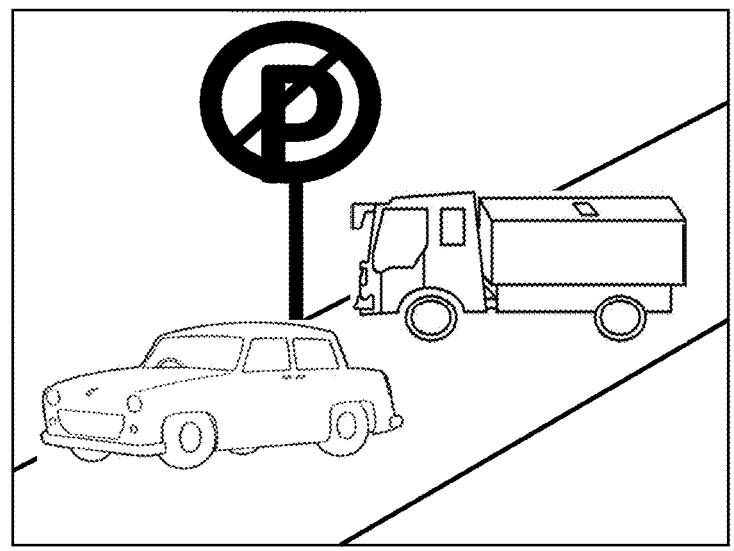
FIG. 1 illustrates an exemplary scene representing on-street parking violations according to some embodiments of the present disclosure.

Parking violations occur when vehicles are parked in a manner neglecting municipal rules on land-use due to expediency. Unauthorized parking takes up considerable street space (e.g., FIG. 1), and makes it difficult for vehicles to pass through the remaining road span. In fact, haphazard parking can result in problems such as traffic congestion due to bottlenecks; safety issues (e.g., ambulance movement); and cause great inconvenience to legitimate users. On-street parking violations are particularly common. The term 'on-street' parking violations refer to illegal parking of vehicles on or in vicinity of roads where parking is prohibited. Typically, such places are designated by putting no-parking signboards/signage (as illustrated in FIG. 1).

It is estimated that the on-street parking violations are bound to increase with increasing per-capita vehicle usage. For example, in most megacities almost 50,000 vehicles get added annually; even if land-use doesn't increase proportionately, with 40% of road space being used for parking. The situation could be better managed by developed countries with rigorous enforcement; but developing nations, with higher population (and violation) densities, continue to struggle with this problem. The growing realization of parking violations as a negative externality (with significant impact) has made their effective management a sine qua non of any smart mobility system.

Additionally, unauthorized parking on city streets is a major contributor to traffic congestion and road accidents. Due to a large scale and density of unauthorized parking problem, citywide monitoring of parking violations has not been highly effective with existing practices (mostly manual); thereby, negatively impacting the revenue of cities.

The conventional system for management of parking violations focus on identification and deterrence. Existing best practices for identification include (mostly manually) analyzing a video feed of streets received from traffic surveillance cameras, and patrolling by enforcement agencies; while deterrence procedures include violation tickets with monetary fines, towing, or wheel clamping. In a big city, especially in a developing nation, the scale of the number of incidents; the spread across streets; and the persistence of serial violators can make it challenging for enforcement agencies to identify all or most instances of such violations, even with semi-automated processes that use limited surveillance cameras. The absence of rigorous enforcement of most violations leads the citizenry to be more expedient in violating parking rules, thus making the problem of parking violations a self-sustaining loop.

There are additional challenges unique to developing countries. These arise due to non-standard practices, such as irregularities in the deployment of no-parking signboards and non-standard parking of vehicles. For example, the road regulations in India require signboards to be 6 feet above the ground, and face perpendicular to the intended viewer. However, in practice, the implementation may be weak due to, for example, signboards facing away from the driver; lower elevation than the prescribed norm due to an awkward bend of the supporting pole; peeled off markings due to corrosion of the painted surface; partial occlusion due to urban foliage, and so on. Moreover, the lack of clear guidelines on the parking style results in vehicles parked parallel to the road or at various angles, which further complicates the detection task if they all are stationed at the same road stretch (as illustrated in FIG. 1).

Due to aforementioned challenges, there is a need for a parking violation solution that can scale with the problem size, even with limited human intervention. While existing approaches have focused on improving and perfecting the normal mode of operations in parking, managing parking violations has not received much attention. There are but few works which address the challenge of managing parking violations at scale. While extensive sensing infrastructure is an obvious (and perhaps most-accurate) strategy for monitoring parking violations, it has scalability and maintenance challenges for a sustainable and cost-effective citywide deployment.

A conventional system utilizes a bike sharing platform for detecting parking violations. Said system is based on the hypothesis that bikers can change their ride trajectories when passing through spots with parking irregularities, and these deviation instances can provide the time and location of the violation. While this is tailor-made for a society with extensive biking lanes and few violations (e.g., Denmark), it may breakdown in places where such deviations are the norm (e.g., in developing countries). In addition, the approach of pushing all bike trajectory data to a central cloud is inefficient for real-time analytics and raises privacy concerns.

Various embodiments disclosed herein provide method and system to overcome the aforementioned challenges associated with conventional on-street parking violation systems and methods. For example, in one embodiment, the disclosed system includes an edge-based monitoring system for detecting parking violations. The disclosed embodiments provides an edge-centric, automated, real-time, privacy-preserving system; which leverages the rear camera of a dashboard mounted electronic device such as a smartphone, and performs visual sensing and location analytics to identify potential parking violations.

In an implementation of the embodiments, the disclosed system enables a lightweight IT application, running on the mobile phone, that captures video of streets with an embedded camera; locally processes the video feed in real-time to identify no-parking signboards/signage and vehicles parked in vicinity of such no-parking signboards; and then matches the identified vehicles with parking policies to detect defaulting vehicles that are illegally parked. In an embodiment, a status report (only) of the defaulting vehicles (i.e. vehicles parked in the vicinity or within a predetermined area of the no-parking signage) is sent to a cloud server communicably coupled with the edge devices, which stores the parking violation information associated with the defaulting vehicles and can further notify various city agencies. Herein, it will be noted that the processing of the video feeds and determination of defaulting vehicles on the edge devices, and determination of parking violation on the cloud server facilitates in providing a technical advantage of reducing computational effort as compared to conventional parking violation detection systems since most of the computation is performed at the edge device. In addition, the non-transfer of complete captured video to the cloud server preserves privacy of citizens encountered in the street view.

The realization of the disclosed system, in practice, is non-trivial due to the following key technical challenges. First, the sensing background consists of a single camera unit in motion that captures visual scenes. This implies that the background and the objects of interest move across captured video frames and create non-uniform appearances. Second, the system needs to identify no parking signage and specific vehicle categories. When viewed from a distance, the dimension of these objects (or objects of interest such as non-parking signage and defaulting parked vehicles) appear small relative to the frame size, and therefore, are difficult to interpret. Third, it is not feasible to measure parking violation span of about 100 m (as per the typical policy at no-parking signboards) with a single camera unit, that typically do not have a reliable detection range beyond 15 m in a single view.

The disclosed system, however, detects the on-street parking violations by overcoming the aforementioned challenges such as (i) small object identification in various non-standard conventional setups by extensive training on a deep learning based convolution detection model; and (ii) limited violation assessment range of around 15 m (a constraint of the smartphone's single camera unit) by augmenting it with a short-term historian and Global Positioning System (GPS) for meeting a 100 m measurement guideline (of parking violations). These are other aspects of the disclosed embodiments will be described in further detail with reference to FIGS. 2-12B.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 2 through FIG. 12B, where similar reference characters denote corresponding features consistently throughout the figures, there are shown preferred embodiments and these embodiments are described in the context of the following exemplary system and/or method.

Figure 2:
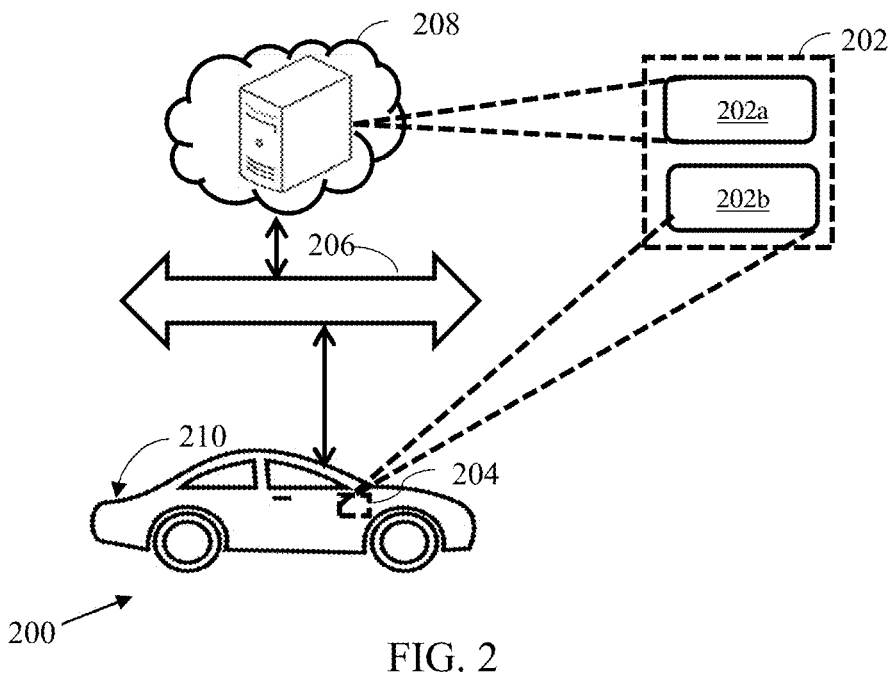
FIG. 2 network implementation of system for detection of on-street parking violations according to some embodiments of the present disclosure.

FIG. 2 illustrates a network implementation 200 of system 202 for detection of on-street parking violations, in accordance with an embodiment of the present subject matter. In various embodiments, the system 202 includes an edge based electronic device, for example, an electronic device 204 that combines a single camera visual sensing mode with edge-compatible machine learning and analytic models. Herein, the edge based electronic device 204 refers to the electronic device that is compliant with edge computing. The term edge computing refers to a distributed computing paradigm which brings computer data storage closer to the location where it is needed. In edge computing, the computation is largely performed on distributed edge device nodes. In the present embodiment, various vehicles such as a vehicle 210 may carry edge compliant/edge based electronic devices. Said edge based electronic devices may perform computations in accordance with the disclosed embodiments. In an embodiment, the disclosed system 202 may be communicably coupled with the edge based electronic devices 204 for facilitating computations and determining on-street parking violations, as explained in the description below.

The disclosed system 202 accounts for the edge platform constraints. In an embodiment, the system 202 employs a method for parking violation that is lightweight and is utilized for detecting parking violations and measuring the violation span. The system 202 utilizes a deep neural network (DNN) based convolution detection model, and address its limitation of identifying small objects in a wide variety of real-world conditions by extensive training and parameter tuning. Additionally, the system 202 utilizes the visual ranging capability of a single camera phone system (embodied in the edge based electronic devices) to measure the violation span, but augment it with a short-term historian and GPS to extend the system range. In an example embodiment, the system 202 is configured to extend a range of detection from around 15 m to a prescribed range of around 100 m using the short-term historian, as will be explained later in the description.

Herein, it will be noted that although the present subject matter is explained considering that the system 202 is implemented for detection of parking violation, it may be understood that the system 202 may is not restricted to any particular machine or environment. The system 202 can be utilized for a variety of domains as well as for data where data with high computational load and complexity is involved. In an embodiment, the system 202 may be distributed between the cloud sever, for example, a cloud server 208 and an electronic device that may be on-board the vehicle 210. The electronic device 204 may include a GPS logging device. As illustrated in FIG. 2, a system 202a may be embodied in the cloud server 208, and a system 202b may be installed in the on-board GPS logging device. The system 202a and the system 202b may be collectively referred to as the system 202.

The system 202 may be implemented in a variety of computing systems, such as a laptop computer, a desktop computer, a notebook, a workstation, a mainframe computer, a server, a network server, and the like. The system 202a may receive the GPS data from multiple devices such as one or more GPS logging devices of the electronic device 204. Examples of the electronic devices 204 may include, but are not limited to, a portable computer, a personal digital assistant, a handheld device, a workstation, GPS sensor embodying devices, as storage devices equipped in the machines to store the GPS data, and so on. The electronic devices 204 are communicatively coupled to the system 202 through a network 206.

In one implementation, the network 206 may be a wireless network, a wired network or a combination thereof. The network 206 can be implemented as one of the different types of networks, such as intranet, local area network (LAN), wide area network (WAN), the internet, and the like. The network 206 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 206 may include a variety of network devices, including routers, bridges, servers, computing devices, storage devices, and the like.

The electronic device, for example, the electronic device 204 may capture video feed of a scene by using a media capture device embodied therein. Herein, the scene may be that of a street, such that the street may have parked or moving vehicles in vicinity of no-parking signage. The system 202a embodied in the electronic device 204 may process the captured video and determines parking violations therefrom. The system 202a may determine the parking violations to the system 202b via the network 210. An example implementation of the system 202 for on-street parking violation is described further with reference to FIG. 3.

Figure 3:
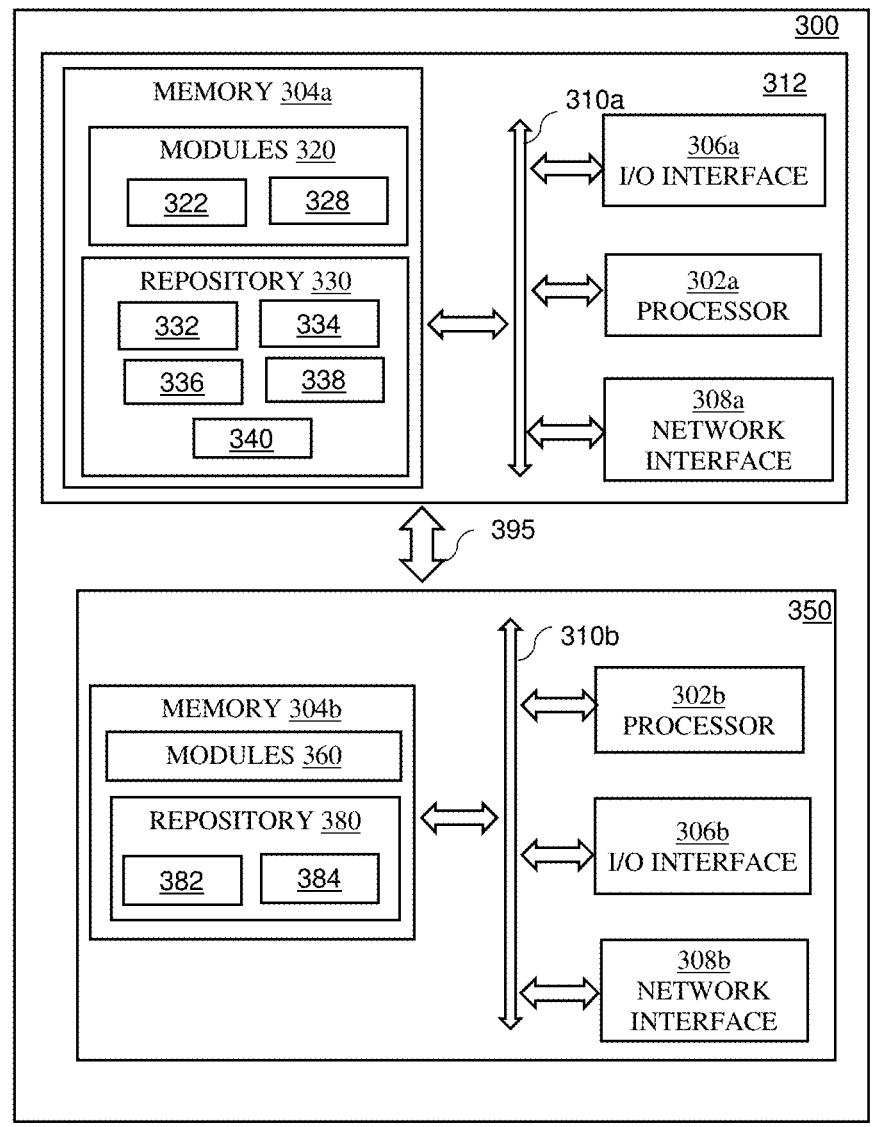
FIG. 3 illustrates a block diagram of a system for on-street parking violation in accordance with some embodiments of the present disclosure.
Figure 4:
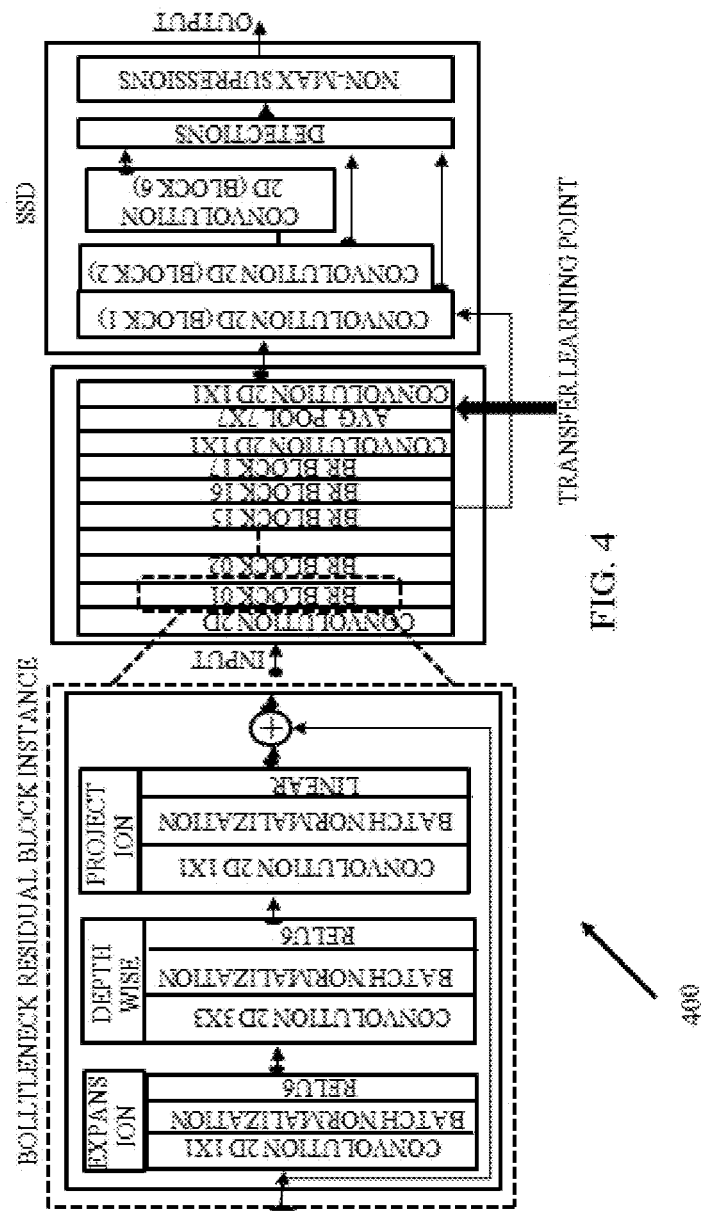
FIG. 4 is an example of a disclosed object detector model associated with the on-street parking violation, according to some embodiments of the present disclosure.

FIG. 3 illustrates a block diagram of a system 300 for on-street parking violation, in accordance with an embodiment of the present disclosure. The system 300 includes or is otherwise in communication with one or more hardware processors such as a first hardware processor 302a, and a second hardware processor 302b; one or more memories such as a memory 304a, 304b; user interfaces such as a user interface 306a, 306b, and a network interface unit such as a network interface unit 308a, 308b.

In an embodiment, the first hardware processor 302a (hereinafter referred to as processor 302a), the memory 304a, the user interface 306a, and the network interface 308a may be coupled by a system bus such as a system bus 310a or a similar mechanism.

Herein, the hardware processor 302a, the memory 304a, the UI 306a, the network interface 308a and the system bus 310a may be embodied in an electronic device, for example the device 204 (of FIG. 2). The electronic device 204 may be an edge enabled device, and hence the hardware processor 302a, the memory 304a, the UI 306a and the network interface 308a may be collectively referred to as edge device system 312 (hereinafter referred to as system 312). Also, since the system 212 is embodied in an electronic device, the terms 'electronic device', 'edge enabled electronic device', and 'system 212' shall be used interchangeably throughout the description.

The hardware processor 302b, the memory 304b, and the UI 306b may be embodied in a cloud server, for example the cloud server 208 (of FIG. 2). In an embodiment, the processor 302b, the memory 304b, the user interface 306b, and the network interface unit 308b may be coupled by a system bus such as a system bus 310b or a similar mechanism. Herein, the hardware processor 302b, the memory 304b, the user interface 306b, and the network interface unit 308b and the system bus 310b are embodied in a cloud server, and hence the hardware processor 302b, the memory 304b, the user interface 306b, and the network interface unit 308b and the system bus 310b may be collectively referred to as a cloud server 350 or the system 350. The system 312 and the cloud server system 350 may communicate over a communication network, for example the communication network 395. The communication network 395 is an example of the network 210 (FIG. 2).

The hardware processors 302a and/or 302b may be implemented as one or more microprocessors, microcomputers, microcontrollers, digital signal processors, central processing units, state machines, logic circuitries, and/or any devices that manipulate signals based on operational instructions. Among other capabilities, the hardware processors 302a and/or 302b are configured to fetch and execute computer-readable instructions stored in the memory 304a and/or 304b, respectively.

The processor 302a/302b may include circuitry implementing, among others, audio, video and logic functions associated with the communication. For example, the processors 302a and/or 302b may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processors 302a and/or 302b thus may also include the functionality to encode messages and/or data or information. The processors 302a and/or 302b may include, among other things, a clock, an arithmetic logic unit (ALU) and logic gates configured to support operation of the processors 302a and/or 302b. Further, the processors 302a and/or 302b may include functionality to execute one or more software programs, which may be stored in the memories 304a and/or 304b or otherwise accessible to the processor 302a and/or 302b.

The I/O interfaces 306a and/or 306b may include a variety of software and hardware interfaces, for example, a web interface, a graphical user interface, and the like. Further, the I/O interface 306a and/or 306b may enable the system 312 and 350, respectively to communicate with other computing devices, such as web servers and external data servers (not shown), and amongst each other. The I/O interfaces 306a and/or 306b may facilitate multiple communications within a wide variety of networks and protocol types, including wired networks, for example, LAN, cable, etc., and wireless networks, such as WLAN, cellular, or satellite. The I/O interfaces 306a and/or 306b may include one or more ports for connecting a number of devices to one another or to another server.

The memories 304a and/or 304b may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The memories 304a and/or 304b may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memories 304a and/or 304b may be configured to store information, data, applications, instructions or the like for enabling the systems 312 and 350, respectively to carry out various functions in accordance with various example embodiments. Additionally or alternatively, the memory 304a, 304b may be configured to store instructions which when executed by the processors 302a and/or 302b, respectively causes the systems 313 and 250, respectively to behave in a manner as described in various embodiments.

In an embodiment, the memory 304a includes a plurality of modules 320 and a repository 330 for storing data processed, received, and generated by one or more of the modules. The modules 320 may include routines, programs, objects, components, data structures, and so on, which perform particular tasks or implement particular abstract data types. In one implementation, the modules 320 may include a GPS data logging module 322 and other modules 328. The modules 320 may also include programs or coded instructions that supplement applications and functions of the system 312.

The repository 330, amongst other things, includes a system database 332 and other data 334. The other data 334 may include data generated as a result of the execution of one or more modules in the other modules 328. The repository 330 is further configured to include logged GPS data 336 and a set of features 338 (required for object detection) computed at the system 312. In addition, the repository may store historians 340 associated with the objects of interest. The GPS data 336, a set of features 338 and the historians 340 are described further in the description.

In an embodiment, the memory 304b includes a plurality of modules 360 and a repository 380 for storing data processed, received, and generated by one or more of the modules. The modules 360 may include routines, programs, objects, components, data structures, and so on, which perform particular tasks or implement particular abstract data types. Additionally, the modules 360 may include programs or coded instructions that supplement applications and functions of the system 350.

The repository 380, amongst other things, includes a system database 382 and other data 384. The other data 384 may include data generated as a result of the execution of one or more modules in the other modules 360. The repository 380 is further configured to include meta-information 382 of vehicles associated with parking violations, a parking violation policy data 384. The meta-information 382 and the parking violation policy data 384 are described further in the description.

Herein, the memory and the computer program code configured to, with the hardware processor, causes the respective system to perform various functions described herein under. For example, the memory such as the memory 304a and the computer program code configured to, with the hardware processor such as the processor 302a, causes the system 312 to perform various functions described herein under. Also, the memory for example the memory 304b and the computer program code configured to, with the hardware processor for example the processor 302b, causes the system 350 to perform various functions described herein under.

In an embodiment, the system 312 captures a video stream of a scene during a trip of the vehicle. In an embodiment, the electronic device embodying the system 312 may include a media capturing device (for example, a camera) for capturing the video stream of the scene. In an example scenario, the electronic device may be a smart phone having a media capturing device such as a camera. Additionally, the electronic device may be GPS enabled so as to determine and record location coordinates of objects of interest in real-time during capturing of the video stream. Herein, the system 312 is configured to detect the no-parking signage and vehicles parked in the vicinity of said 'no-parking signage' so as to detect on-street parking violations. Since the system 312 is configured to detect the objects such as no-parking signage and vehicles parked in vicinity of the no-parking signage, such objects may be referred to as objects of interest for the system 312. Accordingly, herein after the term 'objects of interest' may refer to no-parking signage and vehicles parked in vicinity of the no-parking signage that may be detected in the video stream. In an embodiment, the vicinity of a no-parking signage may be defined by a predetermined area around the no-parking signage.

In an embodiment, prior to capturing of the video stream of the scene, the media capturing device of the system 312 may be calibrated so as to identify objects of interest during capturing. In an embodiment, the system identifies the plurality of objects of interest by employing Convolutional Neural Network (CNN) models for object detection. The core building block of a CNN is a convolutional layer that spatially filters the input to extract relevant features required for object detection. In the present embodiment, the computations pertaining to identification of the objects of interest are to be performed at the edge device, for example the electronic device embodying the system 312. In an embodiment, the disclosed system enables lightweight and real-time system architecture for fast and accurate object detection in a single deep network model. The use of aforementioned system architecture enables in identifying an exhaustive feature set, which can subsequently be used as inputs to a fully connected neural network for high level inferencing tasks. As disclosed previously, examples of the feature in the feature set may include, but are not limited to high-level (such as object parts) and low-level (such as edges and textures).

In an embodiment, the system architecture utilized by the system 312 for object detection may include an object detector model configured by a single-shot multi-box detector (SSD) on a MobileNetV2™ deep architecture. An example of the disclosed object detector model (SSD on a MobileNetV2™ deep architecture) is illustrated with reference to FIG. 4. The MobileNetV2 class of learning models is an improved CNN architecture that is based on the depthwise separate convolution block to replace computationally expensive convolutions. In addition, MobileNetV2 introduces the inverted residual with linear bottleneck block to efficiently make use of low-dimension tensors, which further reduces computation effort. For object detection using SSD, an image data is trained with different bounding box hypotheses, and then a category is selected by giving a highest prediction score. SSD minimizes various computation overheads by predicting category scores and box offsets for a fixed set of bounding boxes using small convolutional filters applied to feature maps. As will be understood, a feature map is a function which maps a data vector to a feature space. Designed as a multi-category object detector, the disclosed system derives its strength by curating a diverse set of bounding box predictions (with different scales and aspect ratios) that cover various object sizes and shapes.

The final output of the object detection is, therefore, a set of bounding boxes that closely matches each of the detected objects along with their respective class backbone for the SSD object detector network. In this design, the input to the SSD layers includes not only the final output from the base network, but also includes the intermediate outputs from previous layers of that network. Thus, it provides an elegant manner of combining features that are both high-level (such as object parts) and low-level (such as edges and textures), for developing an effective detection model.

Herein, it will be understood that the system 312 is designed for an architecture in a scenario of implementation of the disclosed system in which the camera is installed on a moving vehicle while the objects of interest (such as parked vehicles and no-parking signage) are stationary. Such scenarios impose challenges in detection as due to moving camera, the captured video is blurry for most parts in the video feed, except when the vehicle is still (for example, waiting at a traffic signal). Moreover, due to bad road conditions and vehicle body vibrations, the electronic device experiences observable movement; this translates into momentary but frequently occurring distortions of the captured video.

Another challenge with capturing of video stream using vehicle mounted electronic device such as phone camera is creation of non-standard capture conditions, that may happen due to a significant spread in the mounting angle of the electronic device. For instance, the electronic device may be held upright in some conditions or held perpendicular to the street in certain other conditions. In certain other conditions, instances the mounting angle of the electronic device (e.g. the phone) may be skewed by upto 30° from the vertical position. Finally, for cases where the vehicle is not driving on the leftmost lane, there are high chances of the parking scene getting occluded by other vehicles in the lanes to the left. In addition, bad maintenance of signposts and lack of clear guidelines on the parking style of vehicles adds to the detection confusion. In the present scenario of object detection where complex computations at the edge are constrained and hence avoided, the system designs a single model that can be trained on a wide variety of real world conditions.

In order to address the aforementioned challenges, the system 312 embodies transfer learning, where a pre-trained model is reused as the starting point for training a new model for a similar task, when they have a strong ability to generalize to images outside the trained datasets. Specifically, the trained model can be utilized to determine the checkpoints, and then apply said checkpoints for the task of detecting objects of interest (i.e., vehicles and sign posts) according to various embodiments of the present disclosure. The trained model can be re-used for this detection problem by combining it with a custom curated dataset that is specific to the disclosed embodiments. Herein, the custom curated dataset may be curated by specifically include detecting parking violation conditions such as occluded, blurred, distorted, broken sign-boards, and so on.

The disclosed object detector model use accuracy implications by limiting to four object categories, since the specific object detection problem herein is designed as lightweight and devoid of complex computations. Moreover, the objects of interest for the embodiments may fall in the small and medium object categories when imaged from a distance. Due to occurrence of the objects of interest in the small and medium object categories, the disclosed system is modeled to limit the object detection classes to four, and training extensively on these object categories under various non-standard setups, results in an efficient object detector.

The system 312 receives and processes the video stream captured during the trip to identify objects of interest and a meta-information associated with the identified objects of interest. In an embodiment, the system 312 processes the video stream via the first hardware processor 302a associated with the electronic device. In an embodiment, the meta-information may include time of detection of the objects of interest, location of media capturing device (or camera) at the time of detection, distance of the media capturing device from the object of interests, and so on. Herein, the time of detection of objects is determined through a global time capturing module embodied in the electronic device. The location of media capturing device may be obtained based on a GPS module embodied in the electronic device. The GPS module may be configured to provide an absolute location (in terms of latitude and longitude) of objects of interest at the time of detection thereof. The distance of the media capturing device from the object of interests may be obtained as:

$$D = (f * h * H_f) / H_d * H_s$$

Where,

D is distance between the camera and object of interest, f is the focal length of the camera (or media capturing device), h is the actual height of object of interest, $H_f$ is height of a frame having the object of interest in the video stream, and $H_d$ is height of detection box enclosing the object of interest in the frame $H_s$ is the height of a media sensor associated with the media capturing device In an embodiment, the meta-information associated with the identified plurality of objects of interest is stored in the repository 330 associated with the electronic device. In an embodiment, the meta-information is stored in form of a historian. In an example embodiment, the historian may be a short-term historian to store the meta-information for a predefined period of time. The predefined period of time may be a particular period of time, or may be associated with a trip of the vehicle. In an embodiment, the historian may be represented as:

{time-of-detection, camera location, distance (between the camera and object of interest)}

In an embodiment, the system 312 processes the video stream for object detection by using a trained machine leaning model such as a CNN model. The CNN model may be trained by using a training data, as described previously for detecting objects of interest in the video stream in accordance with the embodiments herein. For instance, the trained CNN model identifies object instances in the video stream as one of a parked vehicles and a no-parking signage by using the trained CNN model.

In an embodiment, the system 312 localizes the objects of interest by computing absolute locations of the plurality of objects of interest. In an embodiment, computing the absolute locations of objects of interest includes determining, for two or more consecutive object detection instances in the video stream and determine whether, during the trip, locations values of the media capturing device along at least one of x-coordinate and y-coordinate at the two or more consecutive object detection instances are changing. In an embodiment, it is determined whether the distance between the location of the media capturing device and the object of interest identified in the video stream is decreasing during the two or more consecutive object detection instances. Alternatively, the system 312 may determine whether a bounding box dimension around the identified vehicle in the video stream is increasing during the two or more consecutive readings.

If it is determined that the distance between the location of the media capturing device and said object of interest is decreasing during the two or more consecutive object detection instances, then the system 312 computes the absolute locations based on a determination of relative location values of the media capturing device from the detected objects. For example, if x-coordinate is determined to change during consecutive object detection instances, the distance between the camera and object locations (computed previously) is added/appended to the x-coordinate. Alternatively, if the y-coordinate is determined to change during consecutive instances, then the distance between the camera and object locations (computed previously) is added/appended to the location of y-coordinate. In yet another embodiment, if both x-coordinate and y-coordinate are determined to change, then half of the distance between the camera and object locations (computed previously) is added/appended to both the x-coordinate and y-coordinate to obtain the absolute location of said object of interest. On computation of the absolute location, the system 312 updates the historian with the absolute locations of the said objects of interest (for instance, no-parking signage and one or more vehicles) to obtain an updated historian.

In another example embodiment, where the system 312 computes the absolute locations of objects of interest by determining whether the bounding box dimension around the identified vehicle in the video stream is increasing during the two or more consecutive object detection instance. On determination that the bounding box dimension around the identified object of interest in the video stream is increasing during the two or more consecutive object detection instance, the system 312 updates the historian with the absolute locations of the said objects of interest (for instance, no-parking signage and one or more vehicles). An example illustrating increase of bounding box dimensions for an object of interest when the electronic device is travelling close to the object of interest, is represented in FIG. 7.

An example of the updated historian may include:

{time-of-detection, camera location, distance (between the camera and object of interest, object location)}

Herein, it will be understood that the image capturing device may have a limited usable depth range which may be limited when compared to the depth range required for detecting parking violations by the electronic device installed in a moving vehicle. In an embodiment, the system 312 enhances the violation measurement capability thereof by leveraging the movement of the electronic device. The system 312 may apply meta-tagging to the plurality of parked vehicles identified on the video stream with their locations and time of detection, and maintains a short-term history of these records (said short-term history known as a historian) for each of such objects of interest. On detecting a no-parking signage, the system 312 may trigger estimation of a separation distance between the signage from the one or more parked vehicles. If the distance of the one or more parked vehicles is determined to be less than or equal to a second predetermined threshold distance span on either side of the signage, the system may flag parking violation.

The system 312 filters the plurality of objects of interest to remove errors in object detection. In an embodiment, the system 312 utilizes a feature space of, for instance, {distance, location, bounding box dimension} for filtering the plurality of objects of interest. In particular, the system filters the updated historian to determine (1) a set of unique objects of interest from amongst the plurality of objects of interest, and (2) identify each vehicle from amongst the one or more vehicles as one of parked vehicle and moving vehicle. The set of unique objects of interest and meta-information associated with the parked vehicle is stored in the filtered historian.

In an embodiment, the system 312 determines the set of unique objects of interest from amongst the objects of interest determined in the video stream by performing sequential clustering of the absolute locations of the objects of interest. The sequential clustering includes computing a distance between the two or more consecutive object detection instances associated with the objects of interest, and clustering the two or more consecutive object detection instances as belonging to an object of interest from amongst the plurality of objects of interest if the consecutive object detection instances are spaced at a distance less than a first predetermined threshold distance.

In an embodiment, the first predetermined threshold distance may be obtained from a parking violation data that may be aggregated in at least one of the edge device (electronic device) and the cloud server. The parking violation data may include regulatory compliance information associated with parking violations for a jurisdiction of operation of the disclosed system.

In an embodiment, the system 312 may determine parking violations based on a comparison of the information from the filtered historian with the prescribed parking violation policy. For example, the system 312 may identify, from the filtered historian, the set of unique objects and meta-information associated with the set of unique objects, and then compares the meta-information of said objects against parking violation policies that may be stored in the electronic device. It will be understood that the cloud server (or the system 350 embodied in the cloud server) may also include most recent/updated parking violation policies, and the parking violation policies embodied in the electronic device may be kept in synchronization with the parking violation policies stored in the parking violation policies cloud server.

In an embodiment, the system 312 may compare and send the meta-information associated with parked vehicles to a cloud server to determine the parking violations. In an embodiment, the information that is sent to the cloud server includes the location co-ordinates of the parked vehicles violating the parking rules as mentioned in the prescribed parking violation policy.

In an alternate embodiment, the system 312 may determine the parking violations by comparing the meta-information associated with parked vehicles with the prescribed parking violation policy. For example, for determination of the parking violations, the system 312 may trigger estimation of a separation distance between the signage from the one or more parked vehicles when a no-parking signage is detected in the meta-information received at the system 312. The system 312 computes the distance of the parked vehicles to the no-parking signage. As is understood, the system 312 may retrieve the absolute locations of the parked vehicles and the no-parking signage from the filtered historian. If the distance of the one or more parked vehicles is determined to be less than or equal to a second predetermined threshold distance span on either side of the signage, the system 312 may flag parking violation. In an example, the second predetermined threshold distance may be around 50 m on either side of the no-parking signage. In response to detection of distance of the parked vehicles to be less than the second predetermined threshold distance, the system 312 may send the absolute locations of such violating (parked) vehicles to the cloud server.

As is described above, various embodiments herein facilitate in detecting parking violations at scale by collecting data using smartphones mounted on the windshield of taxi cars, which naturally scale with increasing mobility requirements. The use of COTS smartphone (that are already present in such cars) makes the system low-cost as well. Additionally, the observed media is processed on the edge device (for example, the phone) itself without transferring them to the cloud server. The processing of the media on the phone provides technical advantages in parking violation detection since processing the data locally (and not storing it on the cloud) precludes the concern of privacy, which may arise when storing videos and/or images involving people. Moreover, a lightweight solution that can run on the edge device can provide a real-time decision about whether a particular scene is a parking violation. An example architecture depicting distribution of capture and processing of the media is depicted and described in further detail with respect to FIG. 5.

Figure 5:
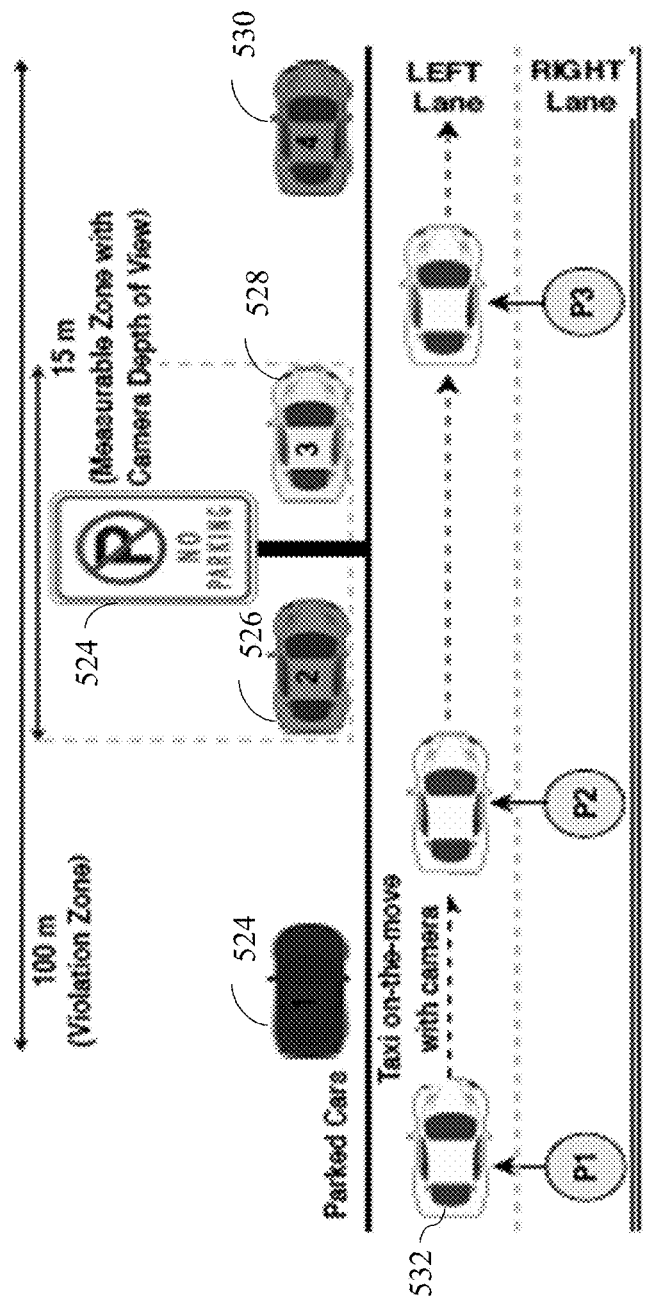
FIG. 5 illustrates an example representation of measurement of parking violation span with a single camera system in accordance with an example embodiment.

FIG. 5 illustrates an example representation of measurement of parking violation span with a single camera system in accordance with an example embodiment. In various scenarios, certain parking regulation enforces drivers not to park on road segments that are within a predetermined range, for instance, 50 m on either side of a no-parking signboard. Therefore, for each such signage for instance a signage 524, a total road span of 100 m may be marked as the no-parking zone. Referring to FIG. 5, all the four parked cars 524, 526, 528 and 530 are in violation of the parking norm. The electronic device for detection of parking violations may be installed in a moving vehicle, for example, the vehicle 532.

For a one-shot measurement of the violation span, the image capturing device (or camera) installed on the electronic device should have an end-to-end detection range of say 100 m; in which case, the system should work without any difficulty from the position P1 of the moving vehicle 532. However, typical embedded single camera units do not support such a large depth of vision, and are mostly limited to less than 15 m. This implies that a violation may not be detected unless the vehicle 532 reaches position P2; thereby, missing a parking violation on parked car 524 and other vehicles in the 05-50 m span in the direction of approach towards the no-parking signboard 522. The same scenario resurfaces when the camera loses the view of the no-parking signage 522, as the moving vehicle 532 goes past position P3. Hence, detecting and auditing the violation span with a single camera system of the electronic device may be challenging. It will however be noted that the disclosed system (for example, the system 300, FIG. 3) leverages the movement of the observing electronic device (embodying the camera) to enhance the violation measurement capability of the system.

In an embodiment, all the parked vehicles, for example, parked vehicles 524, 526, 528, 530 identified on the video stream are meta-tagged with their locations and time of detection. The system (for example, the system 312 of FIG. 3) maintains a short-term history of these records for each such object in a short-term historian. On detecting a no-parking sign, the system 312 is triggered to estimate the separation distance of the sign-board from the parked vehicles (whose information is locally available in the historian), and tag them as violations if they are within the 50 m span on either side of that respective sign. The details of this procedure are as follows.

At step-1, upon detecting a target object: (i) its time of detection $t_i$ is recorded; (ii) the 2D (absolute) location ($x^c_i$, $y^c_i$,) of the moving vehicle is obtained using the phone's on-board GPS sensor; and (iii) the distance $d^{c->i}$ to the identified object is estimated using a pinhole model for a single camera system. Here, i is a rolling counter that keeps track of identified objects, either parked vehicles or a no-parking signboard, and c refer to the id of the electronic device. This meta-information is logged in the phone's historian as a tuple:

$$T_i = \{i, t_i, (x^c_i, y^c_i), d^{c->i}\}$$

At step-2, the system 312 takes the information of $x^c_i$, $y^c_i$, and $d^{c->i}$ and resolves the 2D (absolute) location ($x_i$, $y_i$) of the detected object. Before this, it is assume that there have been (i−1) detections that have occurred. Herein, it will be noted that step-2 must follow step-1 after (at least) two consecutive detection instances/events as there is a need to know whether the coordinates of the camera $x^c$ or $y^c$ are changing over time. The change in $x^c$ (or $y^c$) alone indicates that the object of interest identified can be approximately at a distance $d_i^{c->i}$ away from the camera only along the X-axis (or Y-axis). However, if there is an observable change in both $x^c_i$, and $y^c_i$, then $d_i^{c->i}$ is equally weighted across both the location coordinates.

$$(x_i, y_i) = \begin{cases} (x^c_i, (y^c_i + d^{c->i}_i)), & \text{if } y^c_i \neq y^c_i \\ ((x^c_i + d^{c->i}_i), y^c_i), & \text{if } x^c_i \neq x^c_i \\ ((x^c_i + d^{c->i}_i/2), (y^c_i + d^{c->i}_i/2)), & \text{otherwise} \end{cases}$$

The $(i)^{th}$ entry in the historian is updated with the new column entry of $(x^i; y^i)$ as $$T_i = \{i, t_i, (x^c_i, y^c_i), d_i^{c->i}, (x_i; y_i)\}.$$

In order to uniquely identify objects from different detection instances, object locations are clustered sequentially (as they are obtained on the go), at step-3. The underlying rule groups all such points into a single object and does not add any new entry into the historian, if the distance between two consecutive object locations is less than 1 m.

There are instances where moving vehicles may be incorrectly detected as parked. To overcome such cases, a second heuristic is applied that makes use of the mobility of the camera and considers detected vehicles as parked, only if the distance between the camera and the detected vehicle progressively decreases across frames; and the bounding box dimension of the detected object progressively decreases across frames.

At Step-4, the system 312 is triggered upon detecting a no-parking signage. The system 312 calculates the distance of all parked vehicles to the signboard as per the information available in the historian, and tags those object (vehicle) ids as violations that fall within its 50 m stretch. This data is pushed into the cloud server (embodying the system 350) at a preset interval, and can then be made available to the interested city agencies. An example architecture of a system for detection of on-street parking violations is depicted in FIG. 6 below, in accordance with an example embodiment.

Figure 6:
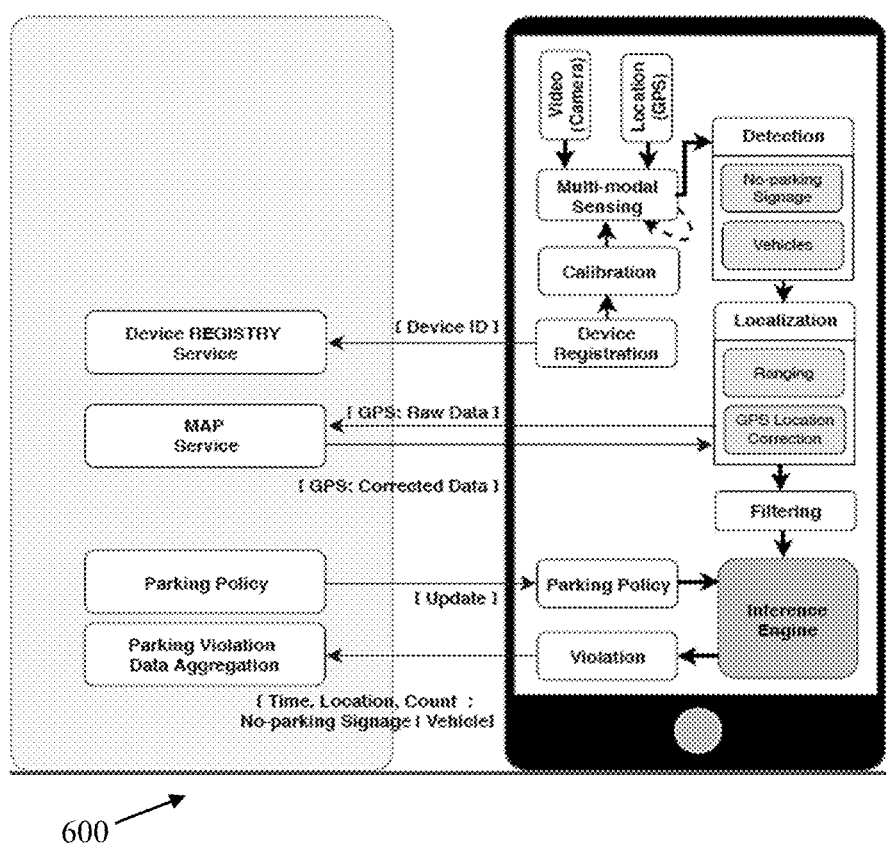
FIG. 6 illustrates example architecture of a system for detection of on-street parking violations is depicted in accordance with an example embodiment.

Referring now to FIG. 6, an example architecture 600 of a system, for example the system 300 (of FIG. 3) for detection of on-street parking violations is depicted in accordance with an example embodiment. The system architecture 600 is includes two major components (1) an edge-based IT application and (2) a cloud-based service. Herein the system 300 may include hardware and software that may collectively be configured to host an edge based IT application for performing the detection of on-street parking violations. Each edge based IT application that runs on a smartphone may first record itself with the cloud registry service. Upon successful registration, the process work flow takes over by calibrating the camera and capturing the video stream of a drive path. As the video streams in frame-by-frame, the edge application may invoke a pre-trained model to identify objects of interest such as the no-parking signage and parked vehicles. When these objects of interest are detected, they are meta-tagged; and stored with their respective location and time of detection. Here, the absolute location is estimated by finding the distance between the phone and the target object, and fusing it with the phone's GPS co-ordinates. The detection of a no-parking signage is used as an event trigger for the inference engine, which then refers to the parking policy knowledge base to identify vehicles violating the prescribed guidelines to park. This meta-information is then sent to a data aggregator on the cloud, which then curates the parking violation zone and span from all such registered edge devices.

As previously discussed, in an example embodiment, the historian having the meta-information of the said objects of interest is updated based on a change in the dimensions of the bounding box around the objects of interest. An example illustrating increase of bounding box dimensions for the object of interest when the electronic device is travelling close to the object of interest, is represented in FIG. 7.

Referring to FIG. 7, an object of interest (for example a car 702) being detected by the disclosed system 300 (FIG. 3) is illustrated. Said object of interest may be detected by an electronic device installed in a moving vehicle. The detected vehicle is shown as bounded in a bounding box 704a. As the moving vehicle goes closer towards the object of interest the dimension of the bounding box enclosing the dimensions of the bounding box around the vehicle 702 increase during the two or more consecutive readings, as is seen from FIG. 7. For example, the bounding box dimensions reduced from the box 704a to 704b to 704c. An example flow diagram of a method for on-street parking violations is illustrated and described with reference to FIG. 8.

Figure 8B:
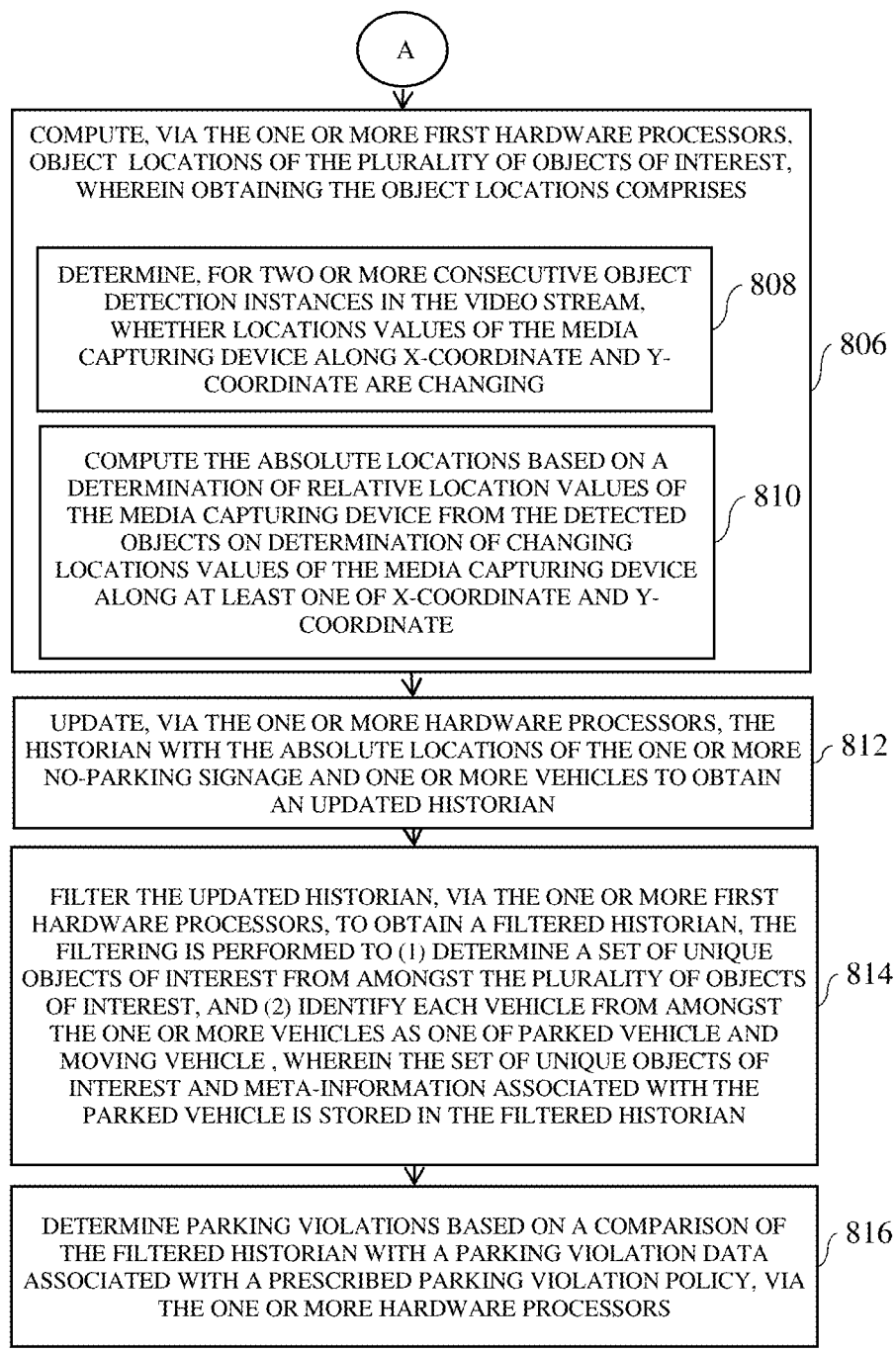

FIG. 8 illustrates an example flow diagram of a method 800 for on-street parking violations, in accordance with an example embodiment. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communication network. The order in which the method 800 is described is not intended to be construed as a limitation, and any number of the described method blocks can be combined in any order to implement the method 800, or an alternative method. Furthermore, the method 800 can be implemented in any suitable hardware, software, firmware, or combination thereof. In an embodiment, the method 800 depicted in the flow chart may be executed by a system, for example, the system 202a of FIG. 1. In an example embodiment, the system 202a may be embodied in an exemplary computer system.

Referring now to FIG. 8, at 802 the method 800 includes receiving a video stream of a scene during a trip of the vehicle. The video stream is captured by using a media capturing device embodied in an electronic device mounted in a vehicle. At 804, the video stream is processed to identify a plurality of objects of interest and a meta-information associated with the plurality of objects of interest. In an embodiment, the video stream is processed by a first hardware processor associated with the electronic device. Herein, the plurality of objects of interest includes one or more no-parking signage and one or more vehicles parked in a predetermined area around the one or more no-parking signage. The meta-information associated with the identified plurality of objects of interest is stored in a repository associated with the electronic device in form of a historian, as described previously with reference to FIG. 3.

At 806, absolute locations of the plurality of objects of interest is computed. In an embodiment, computing the absolute locations includes determining at 808, for two or more consecutive object detection instances in the video stream, whether locations values of the media capturing device along x-coordinate and y-coordinate are changing. If it is determined that the locations values of the media capturing device is changing along at least one of x-coordinate and y-coordinate, the absolute locations are computed based on a determination of relative location values of the media capturing device from the detected objects at 810. Further the short-term historian is updated with the absolute locations of the one or more no-parking signage and one or more vehicles at 812 to obtain an updated historian.

At 814, the updated historian having the meta-information associated with the objects of interest is filtered to determine (1) a set of unique objects of interest from amongst the plurality of objects of interest, and (2) identifying each vehicle from amongst the one or more vehicles as one of parked vehicle and moving vehicle. The set of unique objects of interest and meta-information associated with the parked vehicle are stored in the filtered historian. At 816, the parking violations are determined based on a comparison of the filtered historian with a parking violation data associated with a prescribed parking violation policy. In an embodiment, determining the parking violations includes sending the meta-information associated with parked vehicles to a cloud server for curating a parking violation zone to determine the parking violations. An example scenario illustrating the implementation of the disclosed system and method for improvement of detection of on-street parking violations is described further with reference to FIGS. 9-12B.

Example Scenario

The performance of disclosed system is tested using real world datasets collected from developing regions (for object detection), field experiments (for localization), and on-the-road trials (for latency). Around 12 hours video data was collected and the images were extracted to curate around 10; 000 images with approximately 13,000 objects. The exact count of images and objects in each of the identified categories are shown in Table 1.

TABLE 1

| Class | Sub-class | #Images | #Objects |
|---|---|---|---|
| Road_signs | no_parking | 3,074 | 3,104 |
| 4-wheeled | car | 4,033 | 5,454 |
| 3-wheeled | auto_rickshaw | 1,335 | 1,634 |
| 2-wheeled | motor_bike | 1,838 | 2,940 |
| | Total | 10,280 | 13,132 |

The images were manually labeled according to their respective object class (i.e., <no_parking>, <parked_car>, <parked_auto_rickshaw>, <parked_motor_bike>). For preparing the disclosed object detector model, around 80% of the annotated object images for training and the remaining 20% for testing.

The performance of the object detection model was evaluated using the evaluation standards set by two popular competitions in the field of image recognition, namely, PASCAL VOC and MS COCO. Here, a set of evaluation metrics have been defined to jointly analyze the classification (using mean average precision or mAP) and localization (using IoU) tasks. The PASCAL VOC metrics were used to evaluate the detection accuracy explicitly for each of the four identified object classes, while the MS COCO metrics (that include the object scale and size) were used for comparison with other state-of-the-art embedded detectors. The details of these metrics and their respective calculation methodologies are explained in the following description below.

In an evaluation scheme of PASCAL VOC challenge evaluation metric, the precision-recall (PR) curve and the average precision (AP) are used to characterize the detection performance. The PR curve shows the trade-off between precision and recall at different confidence levels for each object class, and is a useful measure when the the classes are very imbalanced. AP quantities the shape of the PR curve, and is defined as the mean of the interpolated precision values across all recall levels. In this case, AP is calculated with respect to the single IoU threshold of 0:5. The intersection over union (IoU), based on the Jaccard index, is obtained by dividing the area of overlap between the predicted and the ground-truth bounding box by the area of union of the same. Here, the ground-truth refers to the hand labeled bounding boxes from the training set that specify the object of interest in the image, while the predicted one is from the model.

A real-time solution helps the city government to keep pace with short-duration parking violations, which are the ones most likely to be missed by manual patrolling. A lightweight solution helps minimize data costs to the smartphone owner, and any impact on the device performance in its routine operations the phone was originally intended for. While energy savings is a key goal in mobile computing applications typically, we assume that the phone can be powered through the car's electrical system (as is commonly done).

FIG. 9 shows the performance of the disclosed detection model for the four classes at the IoU thresholds of f0:5; 0:70; 0:90 g. A large area under the PR curve (AUC) represents the joint condition of high recall (i.e., low false positive rate) and high precision (i.e., low false negative rate), and therefore, a high AUC implies that the classifier is not only returning accurate results but also a majority of these are positive estimates. In this respect, the <no_parking> class has the best detection record, and it was followed (in order) by the <parked_car>, <parked_auto_rickshaw>, and <parked_motor_bike> categories. This observation remains consistent across all IoUs, which establishes the reliability of the detection model.

Figure 9A:
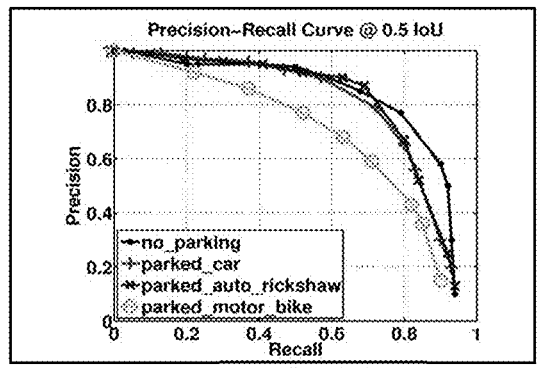
FIGS. 9A and 9B show the performance of the disclosed detection model for the four classes at IoU thresholds, in accordance with an example embodiment.
Figure 9B:
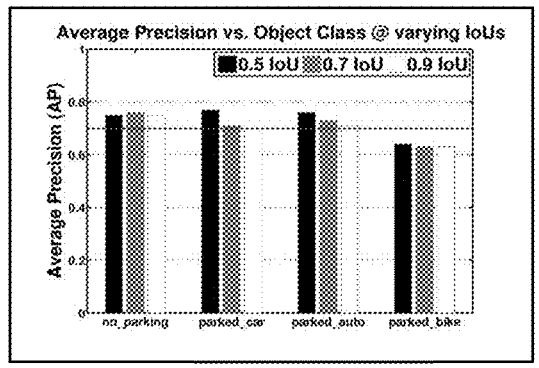

FIGS. 9A and 9B illustrate precision recall curves for for four object classes at IoU of thresholds of {0.5, 0.70, 0.90} in accordance with an example embodiment. Referring to FIG. 9A performance of the disclosed parking violation detection model for the four classes at the IoU thresholds of {0.5, 0.70, 0.90} is illustrated. A large area under the PR curve (AUC) represents the joint condition of high recall (i.e., low false positive rate) and high precision (i.e., low false negative rate), and therefore, a high AUC implies that the classifier is not only returning accurate results but also a majority of these are positive estimates. In this respect, the <no_parking> class has the best detection record, and it was followed (in order) by the <parked_car>, <parked_auto_rickshaw>, and <parked_motor_bike> categories. This observation remains fairly consistent across all IoUs, which establishes the reliability of the detection model (FIG. 9B). Out of all these categories, the detector is least consistent in accurately identifying the <parked_motor_bike> class as is observed from its respective PR curve that appears (almost) as a straight line. For this class, we observed that a single wheel of the bike was mostly visible with its lower torso masked by other parked bikes. There were also situations where people were found sitting on parked bikes. Both of these frequently occurring scenarios impacted its detection accuracy.

Another scheme (i.e. MS COCO challenge evaluation metric) is stricter than the previous approach, and enforces the following set of 12 metrics with various IoUs and object sizes.

Mean average precision (mAP) at IoU=f0:50: 0:05: 0:95; 0:50; 0:75 g

Mean average precision (mAP) at different object scales={small, medium, large}

Mean average recall (mAR) at #detections per image={1; 10; 100}

Mean average recall (mAR) at different object scales={small, medium, large}

It differs from the PASCAL VOC evaluation metric in the following ways. First, both mAP and mAR are averaged over 10 IoU values that range from 0:50 to 0:95 in steps of 0:05. This manner of averaging over multiple IoU thresholds, rather than considering it entirely at the single level of 0:50, tends to reward a model with better object localization. Second, it brings in the aspect of object scale with three distinct categories: small, medium, and large. As the detection in this case is performed from a distance using a mobile setup, most objects end up in the small and medium object categories irrespective of their class.

TABLE 3

| Method | mAP, IoU (0.50-0.95) | 0.5 | 0.75 | mAP, Area (S) | (M) | (L) | mAR, maxDets -1 | | | mAR, Area (S) | (M) | (L) |
|---|---|---|---|---|---|---|---|---|---|---|---|---|
| MobileNetV1 + R-FCN | 0.15 | — | — | 0.01 | 0.1 | 0.25 | — | — | — | — | — | — |
| MobileNetV1 + Faster RCN | 0.17 | — | — | 0.02 | 0.13 | 0.27 | — | — | — | — | — | — |
| MobileNetV1 + SSD300 | 0.22 | — | — | 0.01 | 0.8 | 0.38 | — | — | — | — | — | — |
| MobileNetV1 + SSD300* | 0.26 | 0.55 | 0.21 | 0.07 | 0.28 | 0.37 | 0.32 | 0.42 | 0.43 | 0.2 | 0.45 | 0.58 |
| SSD300 | 0.23 | 0.41 | 0.23 | 0.05 | 0.23 | 0.41 | 0.23 | 0.33 | 0.35 | 0.1 | 0.38 | 0.57 |

Table 3 compares the performance of the disclosed object detector with other competing embedded detectors such as: <MobileNetV1+R-FCN>, <MobileNetV1+Faster RCNN>, <MobileNetV1+SSD300>. It is to be noted that <MobileNetV2> is better than <MobileNetV1> in terms of latency (due to its smaller model foot-print), and not accuracy. Hence, using any of them as the feature extractor backbone for accuracy comparison is justified. With respect to all methods that use the MobileNet backbone, SSD300* is better than R-FCN, Faster RCNN, and SSD300 as it: (i) has the best mAP (over 10 different IoUs), and (ii) is at least three times more accurate in detecting small and medium sized objects10.

The detection accuracy of <MobileNetV2+SSD300> against the parent SSD30011 detector is checked that uses VGCNet as the feature extractor network. Here also, we observe that <MobileNetV2+SSD300> outperforms SSD300 with the best mAP across 11 categories except at the IoU threshold of 0:75.

The disclosed system adopts the pinhole camera model for visual ranging; and given that the operation will be measured from a moving vehicle, this approach provides a lightweight but robust method of obtaining the distance to the detected objects. Since evaluating the ranging performance is difficult to measure correctly under vehicle movement, we experiment with both stationary and mobile setups. Here, the assessment through the stationary mode helps to quantify the ranging performance of the system in its least challenged form, and provides a baseline for mobile ranging results.

In the static experimental setup, each of the target objects were placed at affixed location while the phone (running the disclosed system) was moved along the direct line-of-sight using a measuring tape for establishing the ground truth. It was then repeated with different angular views of 5°-60° between the phone and the objects. For every setting, the experiments were repeated 10 times. It was observed that as long as the object appears in the field of view of the camera and is identified by the detector (as belonging to any of the four object classes), a range estimate could be obtained.

Figure 10:
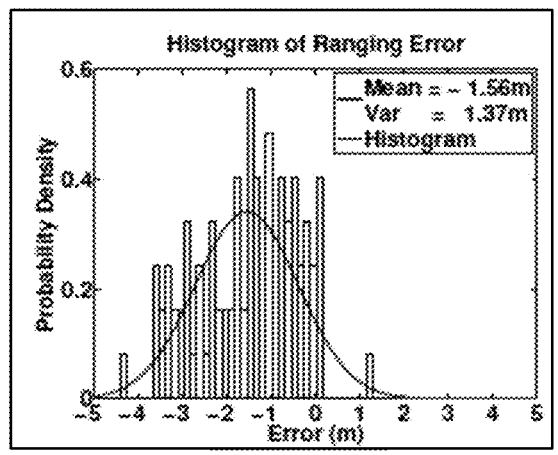
FIG. 10 shows the corresponding ranging errors in the form of a histogram and probability density function, in accordance with an example embodiment.

FIG. 10 shows the corresponding ranging errors in the form of a histogram and probability density function. From the plot, we observe that the ranging error is less than 3 m across all the experimented configurations. It also suggests that the error has a strong negative bias, which implies that the system always underestimates the range, and measures it to be closer to itself than the actual location.

For evaluating the ranging performance under mobility, the vehicle having the electronic device was driven at a speed of 17-20 km/hr towards the objects of interest and the error span (i.e., minimum and maximum) was measured every 5 metres. The same exercise is repeated on three different lanes (left, middle, right), which provide an approximate view angle of 5°-20°, 20°-30° and 30°-60° at the respective separation distances of 10-15 m, 05-10 m and 01-05 m.

TABLE 4

| | Error (m), Angle: | | |
|---|---|---|---|
| Distance (m) | 5°→20° | 20°→30° | 30°→60° |
| 01→05 | — | — | (−) 2-3 |
| 05→10 | — | (−) 3-5 | — |
| 10→15 | (−) 3-5 | — | — |

Table 4 shows the result of these experiments. From the table, it is observed that the errors were between than 2-5 m across various cases. While the recorded results are higher than the stationary setup (as expected), they are within acceptable limits for making useful high-level inferences. It is important to note that these ranging results are not used for further trilateration or multilateration calculations using the absolute location co-ordinates obtained from GPS, but for simple geometrical manipulations, and hence, the ranging accuracy is a direct assessment of the localization performance.

An IT application of the disclosed system is implemented in Android to evaluate its latency. Once the training and testing of the disclosed object detector is done offline, the graph of this improved model is generated in the form of protocol buffer (.pb) and checkpoint (.ckpt) les. It is then optimized to remove redundant layers of the network, and converted into a TensorFlow Lite (.ite) file using the TensorFlow Lite optimizing converter (TOCO), a format that can be imported into our Android application. For ranging, OpenCV libraries were used for Android. The app pertaining to the disclosed system was tested on multiple smartphones that include: (i) Moto G4 Plus and (ii) Moto X PLAY (Qualcomm Snapdragon 617 chipset with octacore CPU with 4 GB and 2 GB RAM, respectively), and (iii) Xiaomi Redmi Note 4 (Qualcomm Snapdragon 625 chipset with octa-core CPU and 4 GB RAM). With 1080p@30 FPS video capture speed, the Xiaomi phone has a 13 MP back camera, whereas the Moto phones have 16 MP and 21 MP cameras, respectively. The measurement latency recorded across all these phones was between 220-250 ms. Thus, the IT application was able to run at a speed of 5 FPS on the phone CPU with an approximate usage of 40%; thereby enabling other phone applications (such as navigation that take up 30% of CPU) to be used concurrently.

Figure 11:
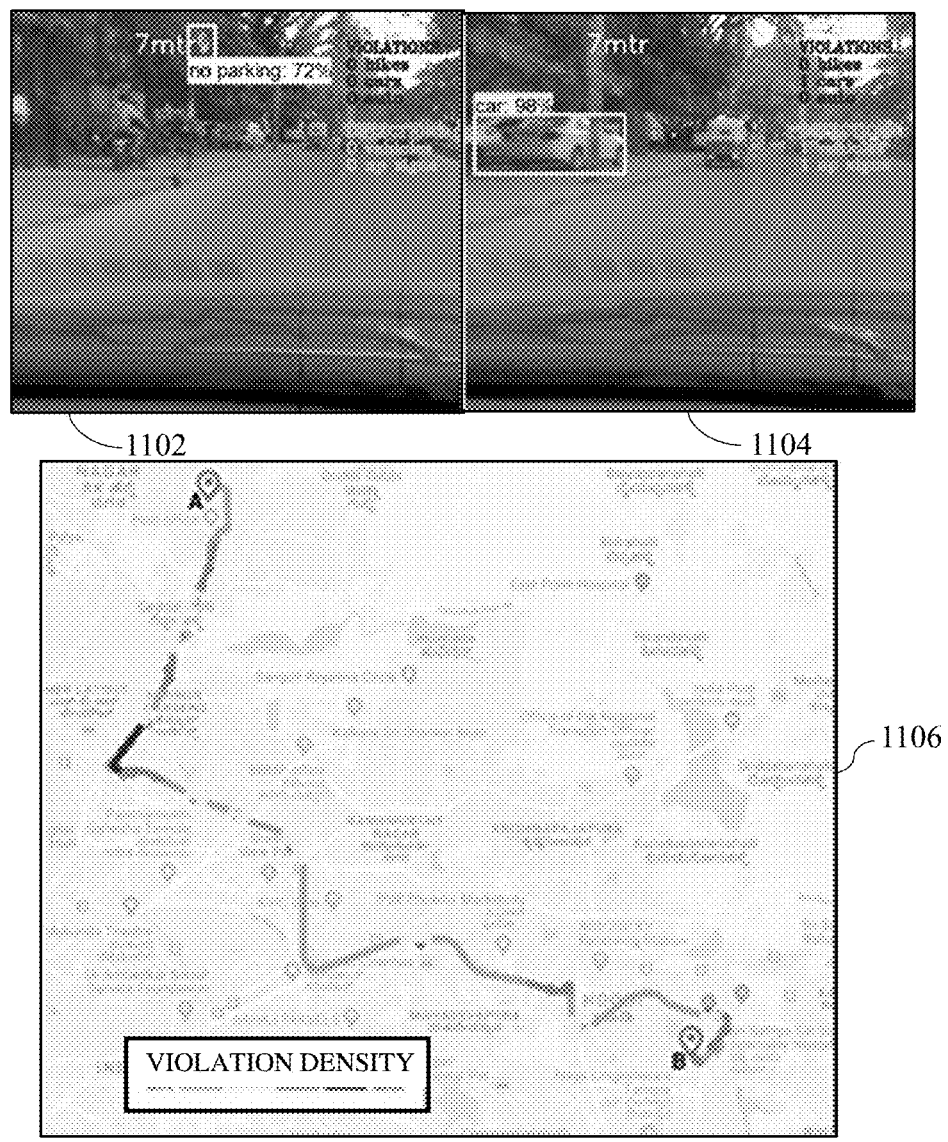
FIG. 11 illustrates output of a system for detection of on-street parking violation in real-time, in accordance with an example embodiment.

FIG. 11 illustrates monitoring of an 'On-street' parking violation by using the disclosed system, in accordance with an embodiment of present disclosure. The images 1102, 1104 illustrate media captured by the media capturing device of the electronic device, and illustrated via the GUI of the IP application associated with the in-street parking violation detection system. As illustrated in the captured media 1102, 1104, the system has accurately detected no-parking signboards and parked vehicles, and displays a respective violation count. The map (on the right) shows the violation density along the 22 km stretch. In an example embodiment, if a number of violations on a stretch of street is determined to be more than a predefined threshold count, the system may cause to display said number in a specific color, for instance, in red color to represent a high degree of violation on said stretch of street. For instance, a map view 1106 may illustrate portions such as portion 1108 in a different color to indicate the parking violations to be more than the predefined threshold.

Figure 12A:
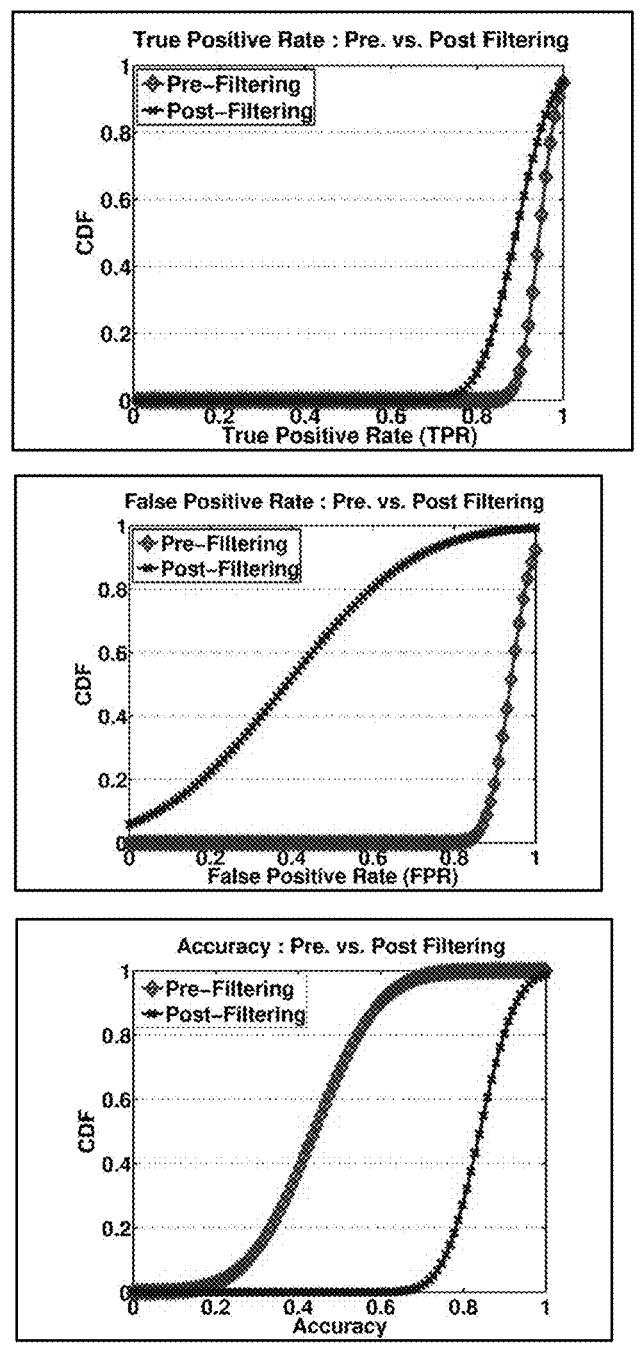
FIGS. 12A and 12B show success rate of the system in flagging illegally parked vehicles based on filtering of objects of interest, in accordance with an example embodiment.

Referring to FIG. 12A an improvement in accuracy obtained on filtering the objects of interest identified in the video stream is illustrated in accordance with an embodiment of present disclosure. Filtering techniques significantly decrease the false positive rates, as a result of which the end-to-end system accuracy increases by a factor of two.

Figure 12B:
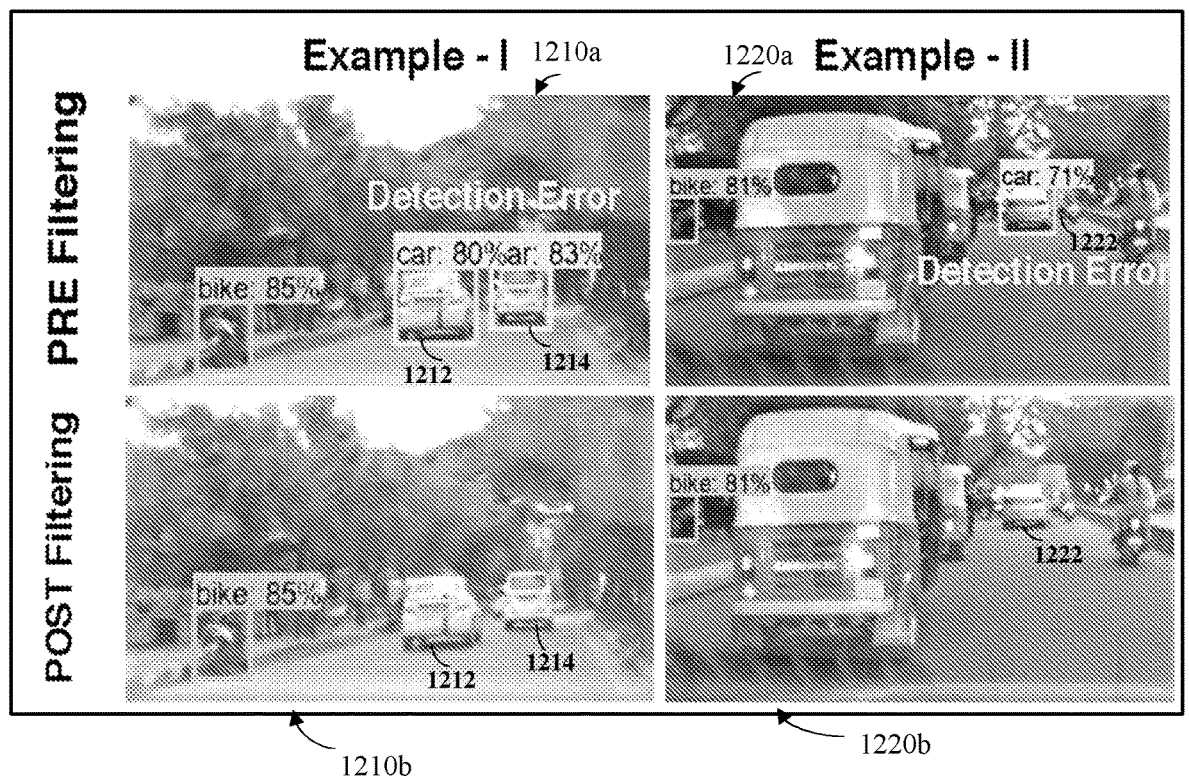

FIG. 12B illustrates instances where moving vehicles were incorrectly detected as parked prior to filtering and detection results post filtering. For example, image 1210a illustrates moving vehicles 1212, 1214 incorrectly identified as parked, while in image 1210b, the moving vehicles 1212, 1214 are not detected by the system as parked. Similarly, in another example image 1220a illustrates moving vehicles 1222 incorrectly identified as parked, while in image 1220b, the moving vehicles 1222 are not detected by the system as parked. As is seen from the examples presented in FIG. 12B, the system along with detection of the parking violations correctly, the system is detecting the moving vehicles as being parked in no-parking zones. However, after performing filtering, the system is not detecting the moving vehicle as parked, thus filtering facilitates in improving accuracy of system for detection of no-parking violations.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provide method and system for detection of on-street parking violations. The disclosed system runs on the ubiquitous smartphone infrastructure that can be used in vehicles (for instance taxi networks); and this makes it low-cost and precludes the need for additional instrumentation, either in the urban environment or on the vehicle. The disclosed system utilizes a rear camera of a dashboard mounted smartphone to view the roadside parking scene from the vehicle as it drives by. Since vehicle networks are a widespread mode of transport, piggybacking on their services achieves scale in street monitoring, both in space and time. The initial setup requires the smartphone to be placed on the windshield or on the dashboard of the car, such that the road is visible to the camera. Thereafter, the remaining processing pipeline executes without any manual intervention. It will be noted that the disclosed system facilitates in detecting on-street parking violations in areas where the real-world visual sensing and manipulation challenges in real-time are more complicated due to non-standard setups and practice codes. In an embodiment, the disclosed system leverages three key technology trends in mobile computing. First, improved sensors and compute hardware have now made edge analytics feasible on commercial on-the-shelf (COTS) smartphones. Second, advances in image processing (both in accuracy and speed) make it possible to run advanced video analytics algorithms on these platforms. Finally, in view of latency and privacy concerns, an edge-centric cloud-enabled ecosystem is becoming the norm.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for detecting on-street parking violations, comprising:
receiving, via one or more first hardware processors associated with an edge based electronic device, a video stream of a scene during a trip of a vehicle, the video stream captured by using a media capturing device embodied in the edge based electronic device mounted in the vehicle, and calibrating the media capturing device prior to capturing the video stream of the scene,
enabling, via the one or more first hardware processors, a lightweight information technology application to capture videos of one or more streets by the media capturing device and identifying one or more feature sets, the one or more feature sets being used as inputs for one or more high level inferencing tasks;
processing, via the one or more first hardware processors, the video stream in real time to identify a plurality of objects of interest and a meta-information associated with the plurality of objects of interest, the plurality of objects of interest comprises one or more no-parking signage and one or more vehicles in a predetermined area around the one or more no-parking signage, the meta-information associated with the plurality of objects of interest stored in a repository associated with the edge based electronic device in form of a historian, wherein the meta-information includes time of detection of the plurality of the objects of interest, location of the media capturing device at the time of detection, and distance of the media capturing device from the plurality of the objects of interest, and wherein processing the video stream to identify the plurality of objects of interest comprises locating, using convolutional neural network (CNN) models, object detection instances in the video stream, and identifying the object detection instance as one of a parked vehicles and a no-parking signage and on detection of a no-parking signage:
triggering estimation of a separation distance between the signage from the one or more parked vehicles; and
flagging a parking violation if the distance of the one or more parked vehicles is determined to be less than or equal to a second predetermined threshold distance span on either side of the signage;
performing, via the one or more first hardware processors, object detection by using an object detector model configured by a single-shot multi box detector (SSD) on a MobileNet V2 deep architecture, wherein performing object detection comprises training image data with one or more bounding box hypotheses and selecting a category for a fixed set of bounding boxes by providing a highest prediction score;
identifying, via the one or more first hardware processors, an exhaustive feature set, the exhaustive feature set being subsequently used as inputs to the CNN models in a fully connected neural network for high level inferencing tasks;
performing, via the one or more first hardware processors, transfer learning, wherein a pre-trained model is reused as a starting point for training a new model for one or more tasks, and wherein the pre-trained model is re-used by combining with a custom curated dataset, the custom curated dataset being curated by including one or more detected parking violations;
computing, via the one or more first hardware processors, absolute locations of the plurality of objects of interest, wherein obtaining the absolute locations of the plurality of objects of interest comprises:
determining, for two or more consecutive object detection instances in the video stream, whether locations values of the media capturing device along x-coordinate and y-coordinate are changing, and
computing, on determination of changing of locations values of the media capturing device along at least one of x-coordinate and y-coordinate, the absolute locations based on relative location values of the media capturing device from the detected objects, wherein computing the absolute locations based on the determination of relative locations values of the media capturing device with respect to one or more vehicles, comprises:

appending distance of the media capturing device to the value of x-coordinate to obtain the absolute location when the value of x-coordinate is determined to change;
appending distance of the media capturing device to the value of y-coordinate to obtain the absolute location when the value of y-coordinate is determined to change; and
appending (distance/2) of the media capturing device to the value of the x-coordinate and the y-coordinate to obtain the absolute location when the value of x-coordinate and the y-coordinate are determined to change;
updating, via the one or more first hardware processors, the historian with the absolute locations of the one or more no-parking signage and the one or more vehicles to obtain an updated historian;
filtering the updated historian, via the one or more first hardware processors, to obtain a filtered historian, the filtering is performed to (1) determine a set of unique objects of interest from amongst the plurality of objects of interest, and (2) identify each vehicle from amongst the one or more vehicles as one of parked vehicle and moving vehicle , wherein the set of unique objects of interest and meta-information associated with the parked vehicle is stored in the filtered historian, wherein the set of unique objects are identified from amongst the plurality of objects of interest based on a sequential clustering of the absolute locations of the plurality of objects of interest, wherein the sequential clustering of the absolute locations of the plurality of objects of interest comprises:
  computing a distance between consecutive object locations associated with the objects of interest; and
  clustering the consecutive object locations as belonging to an object of interest from amongst the plurality of objects of interest when the consecutive object locations are spaced at a distance less than a first predetermined threshold distance, wherein the first predetermined threshold distance is obtained from a parking violation data that is aggregated in at least one of the edge based electronic device and a cloud server; and
  wherein identifying each vehicle from amongst the one or more vehicles as one of parked vehicle and moving vehicle comprises differentiating between parked vehicles and moving vehicles from amongst the plurality of objects of interest, wherein differentiating comprises:
    determining one of, during the trip of the vehicle:
      whether the distance between the location of the media capturing device and the vehicle is decreasing during the two or more consecutive object detection instances, and
      whether the bounding box dimension around the identified vehicle in the video stream is increasing during the two or more consecutive object detection instances; and
    tagging the vehicle as the parked vehicle when:
      the distance between the media capturing device location and the vehicle decreases during the two or more consecutive object detection instances, or
      the bounding box dimension of the identified vehicle increases during the two or more consecutive object detection instances;
applying meta-tagging, via the one or more first hardware processors to the plurality of parked vehicles identified on the video stream with locations and time of detection of the plurality of parked vehicles;
triggering estimation, via the one or more first hardware processors, of a separation distance between the signage from one or more parked vehicles, wherein if the distance of the one or more parked vehicles is determined to be less than or equal to a second predetermined threshold distance span on either side of the signage, then a parking violation is flagged; and
determining, via the one or more first hardware processors, the parking violation at scale based on a comparison of the filtered historian with the parking violation data associated with a prescribed parking violation policy, wherein determining the parking violations comprises sending the meta-information associated with parked vehicles to a cloud server, the cloud server comprising one or more second hardware processors configured to determine the parking violations based on the meta-information, wherein the parking violations comprises detecting parking violation conditions including at least one of occluded, blurred, distorted, and broken sign-boards.

2. A system for detecting on-street parking violations, comprising:
one or more memories; and
one or more first hardware processors, the one or more first memories coupled to the one or more first hardware processors, wherein the one or more first hardware processors are configured to execute programmed instructions stored in the one or more first memories to:
  receive a video stream of a scene during a trip of a vehicle, the video stream captured by using a media capturing device embodied in an edge based electronic device mounted in the vehicle, and calibrate the media capturing device prior to capturing the video stream of the scene;
  enable a lightweight information technology application to capture videos of one or more streets by the media capturing device and identifying one or more feature sets, the one or more feature sets being used as inputs for one or more high level inferencing tasks;
  process the video stream to identify a plurality of objects of interest and a meta-information associated with the plurality of objects of interest, the plurality of objects of interest comprises one or more no-parking signage and one or more vehicles in a predetermined area around the one or more no-parking signage, the meta-information associated with the plurality of objects of interest stored in a repository associated with the edge based electronic device in form of a historian, wherein the meta-information includes time of detection of the plurality of the objects of interest, location of the media capturing device at the time of detection, and distance of the media capturing device from the plurality of the objects of interest, and wherein processing the video stream to identify the plurality of objects of interest comprises locating, using convolutional neural network (CNN) models, object detection instances in the video stream, and identifying the object detection instance as one of a parked vehicles and a no-parking signage and on detection of a no-parking signage:

triggering estimation of a separation distance between the signage from the one or more parked vehicles; and flagging a parking violation if the distance of the one or more parked vehicles is determined to be less than or equal to a second predetermined threshold distance span on either side of the signage;

perform object detection by using an object detector model configured by a single-shot multi box detector (SSD) on a MobileNet V2 deep architecture, wherein performing object detection comprises training image data with one or more bounding box hypotheses and selecting a category for a fixed set of bounding boxes by providing a highest prediction score;

identify, an exhaustive feature set, the exhaustive feature set being subsequently used as inputs to the CNN models in a fully connected neural network for high level inferencing tasks;

perform transfer learning, wherein a pre-trained model is reused as a starting point for training a new model for one or more tasks, and wherein the pre-trained model is re-used by combining with a custom curated dataset, the custom curated dataset being curated by including one or more detected parking violations;

compute absolute locations of the plurality of objects of interest, wherein obtaining the absolute locations of the plurality of objects of interests comprises:
determine, for two or more consecutive object detection instances in the video stream, whether locations values of the media capturing device along x-coordinate and y-coordinate are changing, and compute, on determination of changing of locations values of the media capturing device along at least one of x-coordinate and y-coordinate, the absolute locations based on relative location values of the media capturing device from the detected objects, wherein to compute the absolute locations based on the determination of relative locations values of the media capturing device, the one or more first hardware processor are configured by the instructions to:
append distance of the media capturing device to the value of x-coordinate to obtain the absolute location when the value of x-coordinate is determined to change;
append distance of the media capturing device to the value of y-coordinate to obtain the absolute location when the value of y-coordinate is determined to change; and
append (distance/2) of the media capturing device to the value of the x-coordinate and the y-coordinate to obtain the absolute location when the value of x coordinate and the y-coordinate are determined to change;
update the historian with the absolute locations of the one or more no-parking signage and the one or more vehicles to obtain an updated historian;
filter the updated historian to obtain a filtered historian, the filtering is performed to (1) determine a set of unique objects of interest from amongst the plurality of objects of interest, and (2) identify each vehicle from amongst the one or more vehicles as one of parked vehicle and moving vehicle, wherein the set of unique objects of interest and meta-information associated with the parked vehicle is stored in the filtered historian wherein the set of unique objects are identified from amongst the plurality of objects of interest based on a sequential clustering of the absolute locations of the plurality of objects of interest, wherein the sequential clustering of the absolute locations of the plurality of objects of interest comprises:
computing a distance between consecutive object locations associated with the objects of interest; and
clustering the consecutive object locations as belonging to an object of interest from amongst the plurality of objects of interest when the consecutive object locations are spaced at a distance less than a first predetermined threshold distance, wherein the first predetermined threshold distance is obtained from a parking violation data that is aggregated in at least one of the edge based electronic device and the cloud server; and
wherein identifying each vehicle from amongst the one or more vehicles as one of parked vehicle and moving vehicle comprises differentiating between parked vehicles and moving vehicles from amongst the plurality of objects of interest, wherein differentiating comprises:
determining one of, during the trip of the vehicle:
whether the distance between the location of the media capturing device and the vehicle is decreasing during the two or more consecutive object detection instances, and
whether the bounding box dimension around the identified vehicle in the video stream is increasing during the two or more consecutive object detection instances; and
tagging the vehicle as the parked vehicle when:
the distance between the media capturing device location and the vehicle decreases during the two or more consecutive object detection instances, or
the bounding box dimension of the identified vehicle increases during the two or more consecutive object detection instances;
apply meta-tagging, to the plurality of parked vehicles identified on the video stream with locations and time of detection of the plurality of parked vehicles;
trigger estimation of a separation distance between the signage from one or more parked vehicles, wherein if the distance of the one or more parked vehicles is determined to be less than or equal to a second predetermined threshold distance span on either side of the signage, then a parking violation is flagged; and
determine the parking violation at scale based on a comparison of the filtered historian with a parking violation data associated with a prescribed parking violation policy, wherein determining the parking violations comprises sending the meta-information associated with parked vehicles to a cloud server, the cloud server comprising one or more second hardware processors configured to determine the parking violations based on the meta-information, wherein the parking violations comprises detecting parking violation conditions including at least one of occluded, blurred, distorted, and broken sign-boards.

3. One or more non-transitory machine readable information storage mediums comprising one or more instructions which when executed by one or more hardware processors cause:

receiving, via one or more first hardware processors associated with an electronic device, a video stream of a scene during a trip of a vehicle, the video stream captured by using a media capturing device embodied in the electronic device mounted in the vehicle, and calibrating the media capturing device prior to capturing the video stream of the scene;

enabling, via the one or more first hardware processors, a lightweight information technology application to capture videos of one or more streets by the media capturing device and identifying one or more feature sets, the one or more feature sets being used as inputs for one or more high level inferencing tasks;

processing, via the one or more first hardware processors, the video stream in real time to identify a plurality of objects of interest and a meta-information associated with the plurality of objects of interest, the plurality of objects of interest comprises one or more no-parking signage and one or more vehicles in a predetermined area around the one or more no-parking signage, the meta-information associated with the plurality of objects of interest stored in a repository associated with the electronic device in form of a historian, wherein the meta-information includes time of detection of the plurality of the objects of interest, location of the media capturing device at the time of detection, and distance of the media capturing device from the plurality of the objects of interest and wherein processing the video stream to identify the plurality of objects of interest comprises locating, using convolutional neural network (CNN) models, object detection instances in the video stream, and identifying the object detection instance as one of a parked vehicles and a no-parking signage and on detection of a no-parking signage:

triggering estimation of a separation distance between the signage from the one or more parked vehicles; and flagging a parking violation if the distance of the one or more parked vehicles is determined to be less than or equal to a second predetermined threshold distance span on either side of the signage;

performing, via the one or more first hardware processors, object detection by using an object detector model configured by a single-shot multi box detector (SSD) on a MobileNet V2 deep architecture, wherein performing object detection comprises training image data with one or more bounding box hypotheses and selecting a category for a fixed set of bounding boxes by providing a highest prediction score;

identifying, via the one or more first hardware processors, an exhaustive feature set, the exhaustive feature set being subsequently used as inputs to the CNN models in a fully connected neural network for high level inferencing tasks;

performing, via the one or more first hardware processors, transfer learning, wherein a pre-trained model is reused as a starting point for training a new model for one or more tasks, and wherein the pre-trained model is re-used by combining with a custom curated dataset, the custom curated dataset being curated by including one or more detected parking violations;

computing, via the one or more first hardware processors, absolute locations of the plurality of objects of interest, wherein obtaining the absolute locations of the plurality of objects of interest comprises:

determining, for two or more consecutive object detection instances in the video stream, whether locations values of the media capturing device along x-coordinate and y-coordinate are changing, and computing, on determination of changing of locations values of the media capturing device along at least one of x-coordinate and y-coordinate, the absolute locations based on relative location values of the media capturing device from the detected objects, wherein to compute the absolute locations based on the determination of relative locations values of the media capturing device, the one or more first hardware processor are configured by the instructions to:

append distance of the media capturing device to the value of x-coordinate to obtain the absolute location when the value of x-coordinate is determined to change;

append distance of the media capturing device to the value of y-coordinate to obtain the absolute location when the value of y-coordinate is determined to change; and append (distance/2) of the media capturing device to the value of the x-coordinate and the y-coordinate to obtain the absolute location when the value of x coordinate and the y-coordinate are determined to change;

updating, via the one or more first hardware processors, the historian with the absolute locations of the one or more no-parking signage and the one or more vehicles to obtain an updated historian;

filtering the updated historian, via the one or more first hardware processors, to obtain a filtered historian, the filtering is performed to (1) determine a set of unique objects of interest from amongst the plurality of objects of interest, and (2) identify each vehicle from amongst the one or more vehicles as one of parked vehicle and moving vehicle, wherein the set of unique objects of interest and meta-information associated with the parked vehicle is stored in the filtered historian, wherein the set of unique objects are identified from amongst the plurality of objects of interest based on a sequential clustering of the absolute locations of the plurality of objects of interest, wherein the sequential clustering of the absolute locations of the plurality of objects of interest comprises:

computing a distance between consecutive object locations associated with the objects of interest; and clustering the consecutive object locations as belonging to an object of interest from amongst the plurality of objects of interest when the consecutive object locations are spaced at a distance less than a first predetermined threshold distance, wherein the first predetermined threshold distance is obtained from a parking violation data that is aggregated in at least one of the edge based electronic device and the cloud server; and wherein identifying each vehicle from amongst the one or more vehicles as one of parked vehicle and moving vehicle comprises differentiating between parked vehicles and moving vehicles from amongst the plurality of objects of interest, wherein differentiating comprises:
determining one of, during the trip of the vehicle:
whether the distance between the location of the media capturing device and the vehicle is decreasing during the two or more consecutive object detection instances, and
whether the bounding box dimension around the identified vehicle in the video stream is increasing during the two or more consecutive object detection instances; and
tagging the vehicle as the parked vehicle when:
the distance between the media capturing device location and the vehicle decreases during the two or more consecutive object detection instances, or
the bounding box dimension of the identified vehicle increases during the two or more consecutive object detection instances;
applying meta-tagging, via the one or more first hardware processors to the plurality of parked vehicles identified on the video stream with locations and time of detection of the plurality of parked vehicles;
triggering estimation, via the one or more first hardware processors, of a separation distance between the signage from one or more parked vehicles, wherein if the distance of the one or more parked vehicles is determined to be less than or equal to a second predetermined threshold distance span on either side of the signage, then a parking violation is flagged; and
determining, via the one or more first hardware processors, the parking violation at scale based on a comparison of the filtered historian with a parking violation data associated with a prescribed parking violation policy, wherein determining the parking violations comprises sending the meta-information associated with parked vehicles to a cloud server, the cloud server comprising one or more second hardware processors configured to determine the parking violations based on the meta-information, wherein the parking violations comprises detecting parking violation conditions including at least one of occluded, blurred, distorted, and broken sign-boards.

* * * * *